(12) United States Patent
Choi et al.

(10) Patent No.: US 9,661,501 B2
(45) Date of Patent: May 23, 2017

(54) MOBILE TERMINAL AND METHOD FOR CONTROLLING THE SAME

(71) Applicant: LG ELECTRONICS INC., Seoul (KR)

(72) Inventors: Jian Choi, Seoul (KR); Namki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/845,966

(22) Filed: Sep. 4, 2015

(65) Prior Publication Data

US 2016/0302068 A1  Oct. 13, 2016

(30) Foreign Application Priority Data

Apr. 8, 2015 (KR) .......................... 10-2015-0049471

(51) Int. Cl.
| | |
|---|---|
| *H04M 1/725* | (2006.01) |
| *H04W 12/08* | (2009.01) |
| *H04W 12/06* | (2009.01) |
| *H04L 29/06* | (2006.01) |

(52) U.S. Cl.
CPC .......... *H04W 12/08* (2013.01); *H04L 63/105* (2013.01); *H04L 63/20* (2013.01); *H04M 1/72577* (2013.01); *H04W 12/06* (2013.01)

(58) Field of Classification Search
CPC ..... H04W 12/06; H04W 12/12; H04W 12/08; H04W 88/02; H04L 63/08

USPC ......................................... 455/26.1, 411, 566
See application file for complete search history.

(56) References Cited

U.S. PATENT DOCUMENTS

| | | | |
|---|---|---|---|
| 9,456,072 B2 * | 9/2016 | Kwon | G06F 21/36 |
| 2013/0169568 A1 * | 7/2013 | Park | G06F 3/0488 |
| | | | 345/173 |
| 2014/0145990 A1 * | 5/2014 | Ho | G06F 3/04883 |
| | | | 345/173 |
| 2014/0164907 A1 * | 6/2014 | Jung | G06F 3/0488 |
| | | | 715/234 |
| 2014/0230048 A1 * | 8/2014 | Wang | G06F 21/32 |
| | | | 726/19 |
| 2015/0050916 A1 * | 2/2015 | Bandyopadhyay | G06F 1/1643 |
| | | | 455/411 |
| 2015/0207922 A1 * | 7/2015 | Kobayashi | H04M 1/67 |
| | | | 455/411 |
| 2015/0213250 A1 * | 7/2015 | Wu | G06F 21/36 |
| | | | 726/19 |
| 2015/0381798 A1 * | 12/2015 | Yoon | H04M 1/72577 |
| | | | 455/411 |

(Continued)

*Primary Examiner* — Cong Tran
(74) *Attorney, Agent, or Firm* — KED & Associates, LLP

(57) ABSTRACT

The present disclosure relates to a mobile terminal and a method of controlling therefor. According to one embodiment of the present disclosure, the mobile terminal can include a display unit, a sensing unit configured to sense an input signal and a controller, the controller, if a first input signal is sensed in a state that the display unit is inactivated, configured to enter a first unlock mode, the controller, if the first input signal is sensed in a state that the display unit is activated, configured to enter a second unlock mode. In this case, at least a part is different from each other between contents provided in the first unlock mode and contents provided in the second unlock mode.

20 Claims, 24 Drawing Sheets

(56) References Cited

U.S. PATENT DOCUMENTS

2016/0044502 A1* 2/2016 Jung .................. H04M 1/7253
                                                                                     455/411

* cited by examiner

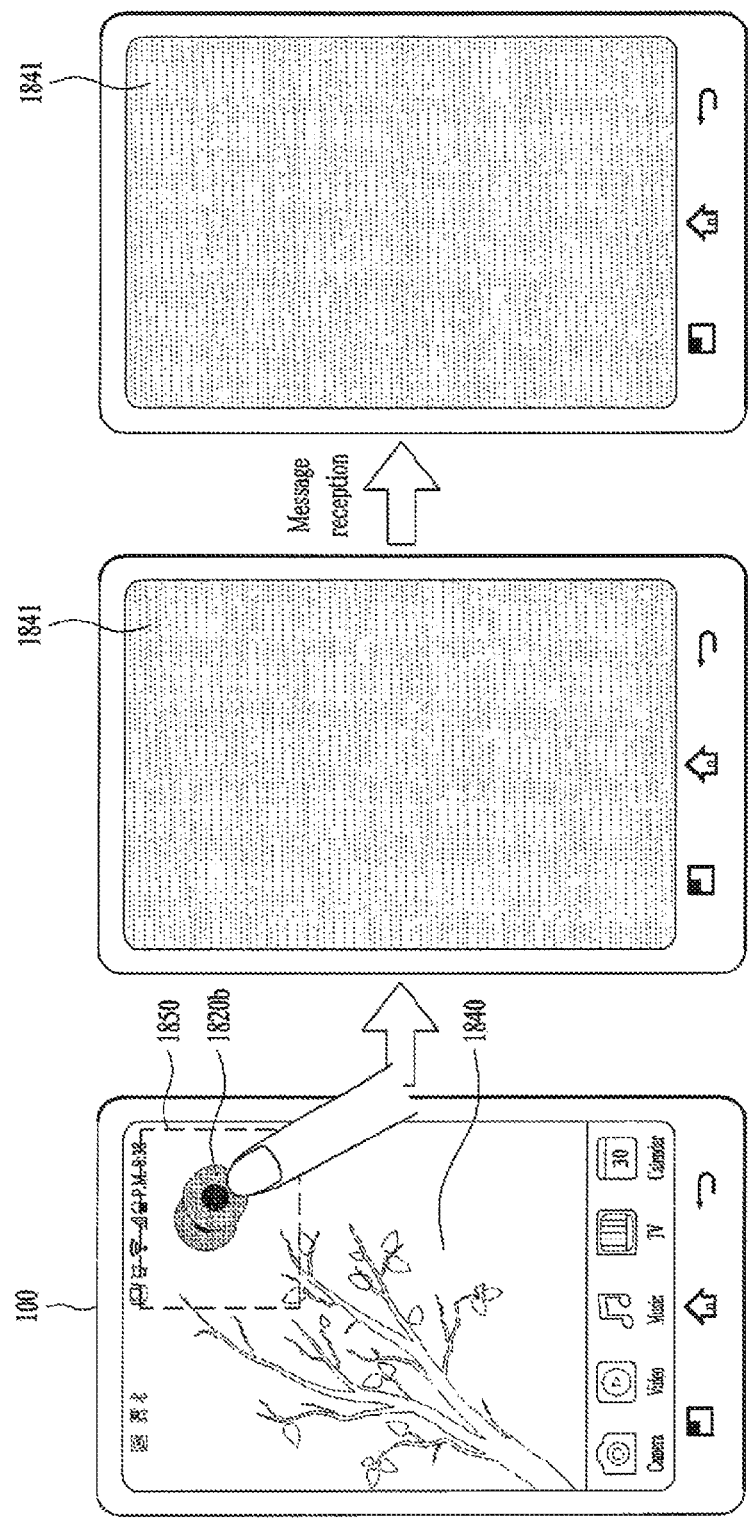

MOBILE TERMINAL AND METHOD FOR CONTROLLING THE SAME

CROSS-REFERENCE TO RELATED APPLICATION

This application claims priority under 35 U.S.C. §119 to Korean Patent Application No. 10-2015-0049471 filed on Apr. 8, 2015, whose entire disclosure is hereby incorporated by reference.

BACKGROUND

1. Field

The present disclosure relates to a mobile terminal and a method of controlling therefor.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, for security, a mobile terminal may have a mode not providing a partial content to a user and a mode providing all contents to the user. In this case, if two or more input signals are configured to enter each mode, the user may feel inconvenience when the user uses the mobile terminal.

SUMMARY OF THE INVENTION

Accordingly, an object of the present disclosure is to address the above-noted and other problems.

Another object of the present disclosure is to provide a mobile terminal providing a plurality of modes to be used based on a position at which an input signal is sensed and a method of controlling therefor.

Another object of the present disclosure is to provide a mobile terminal providing a plurality of modes to be used based on whether a display unit is activated and a method of controlling therefor.

The other object of the present disclosure is to provide a mobile terminal providing a plurality of modes to be used based on a use mode of an external digital device and a method of controlling therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, according to one embodiment of the present disclosure, a mobile terminal can include a display unit, a sensing unit configured to sense an input signal and a controller, the controller, if a first input signal is sensed in a state that the display unit is inactivated (or deactivated), configured to enter a first unlock mode, the controller, if the first input signal is sensed in a state that the display unit is activated, configured to enter a second unlock mode. In this case, at least a part is different from each other between contents provided in the first unlock mode and contents provided in the second unlock mode.

To further achieve these objects and other advantages and in accordance with the purpose of the disclosure, as embodied and broadly described herein, according to a different embodiment of the present disclosure, a mobile terminal can include a display unit, a sensing unit configured to sense an input signal and a controller, the controller, if a first input signal is sensed on a predetermined area of the display unit, configured to enter a first unlock mode, the controller, if the first input signal is sensed on an area except the predetermined area of the display unit, configured to enter a second unlock mode. In this case, at least a part is different from each other between contents provided in the first unlock mode and contents provided in the second unlock mode.

To further achieve these objects and other advantages and in accordance with the purpose of the disclosure, as embodied and broadly described herein, according to a different embodiment of the present disclosure, a mobile terminal can include a display unit, a sensing unit configured to sense an input signal, a communication unit configured to receive a signal from an external digital device and a controller, the controller configured to receive a first signal indicating a first use mode of the external digital device or a second signal indicating a second use mode of the external digital device, the controller configured to receive the first signal from the external digital device, the controller, if the first signal is received from the external digital device and a first input signal inputted on the display unit is sensed, configured to enter a first unlock mode, the controller, if the second signal is received from the external digital device and the first input signal inputted on the display unit is sensed, configured to enter a second unlock mode. In this case, at least a part is different from each other between contents provided in the first unlock mode and contents provided in the second unlock mode.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The embodiments will be described in detail with reference to the following drawings in which like reference numerals refer to like elements wherein:

FIGS. 18A to 18C are diagrams for explaining an example of a method of entering a lock mode from an unlock mode of a mobile terminal according to one embodiment of the present disclosure;

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
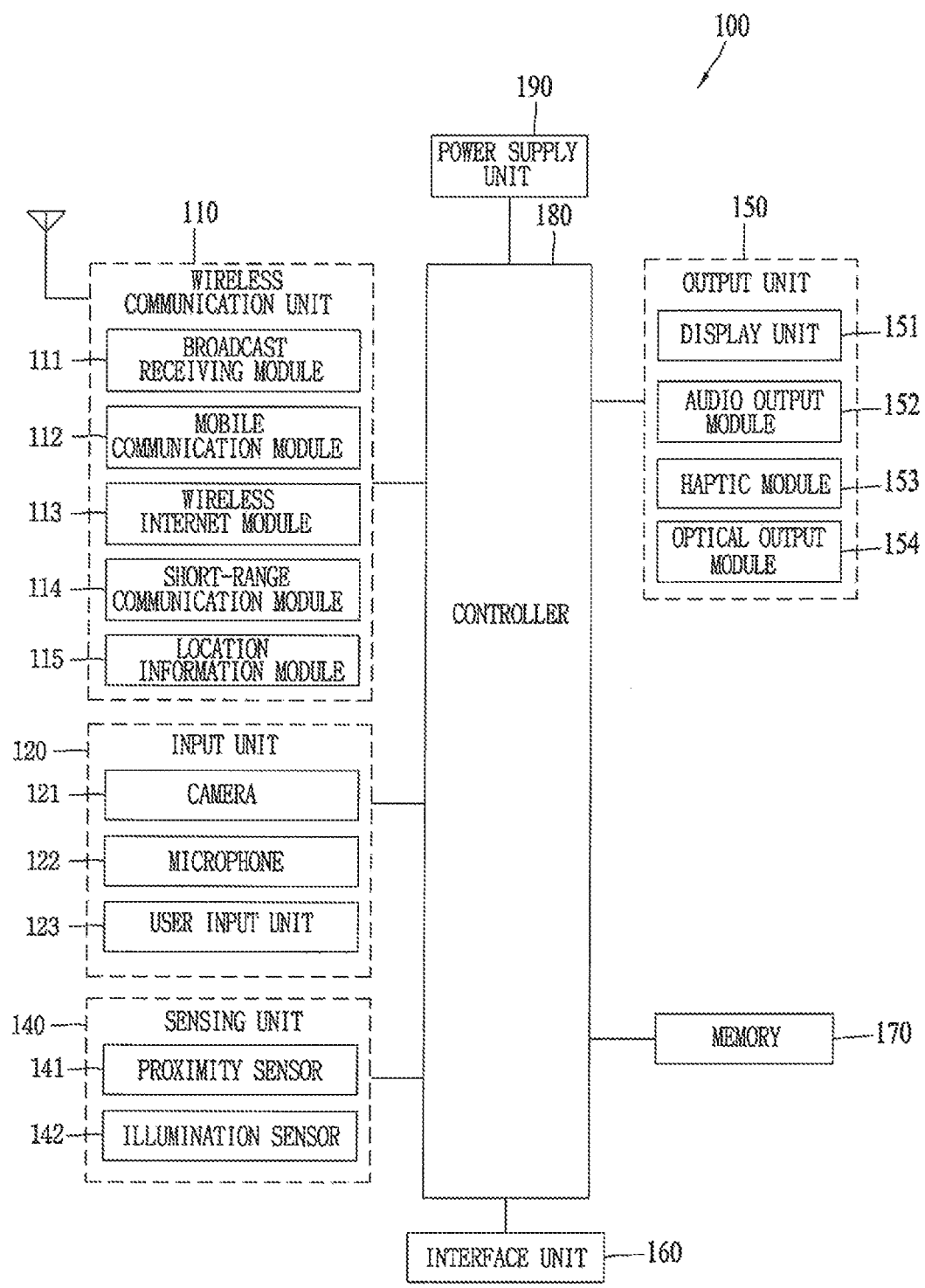
FIG. 1A is a block diagram of a mobile terminal in accordance with the present disclosure.
Figure 1B:
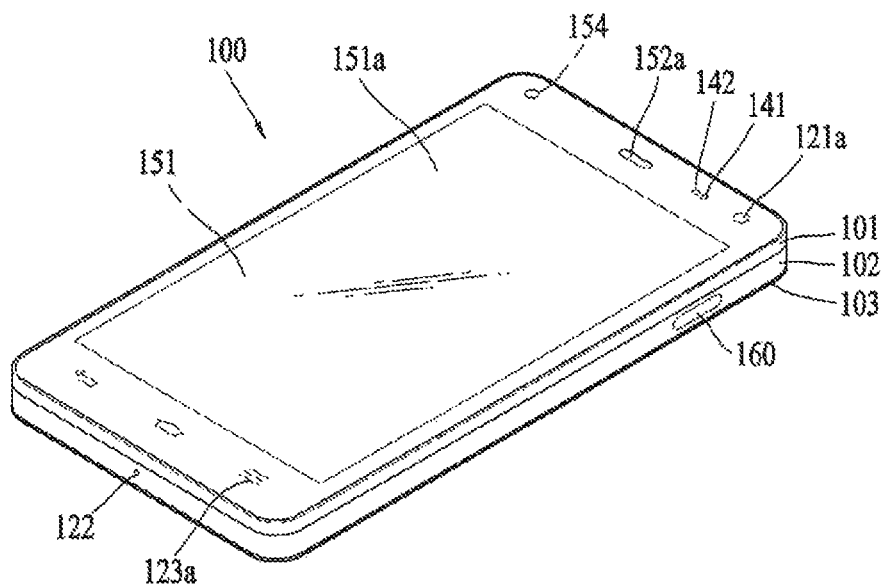
FIGS. 1B and 1C are conceptual views of one example of the mobile terminal, viewed from different directions.
Figure 1C:
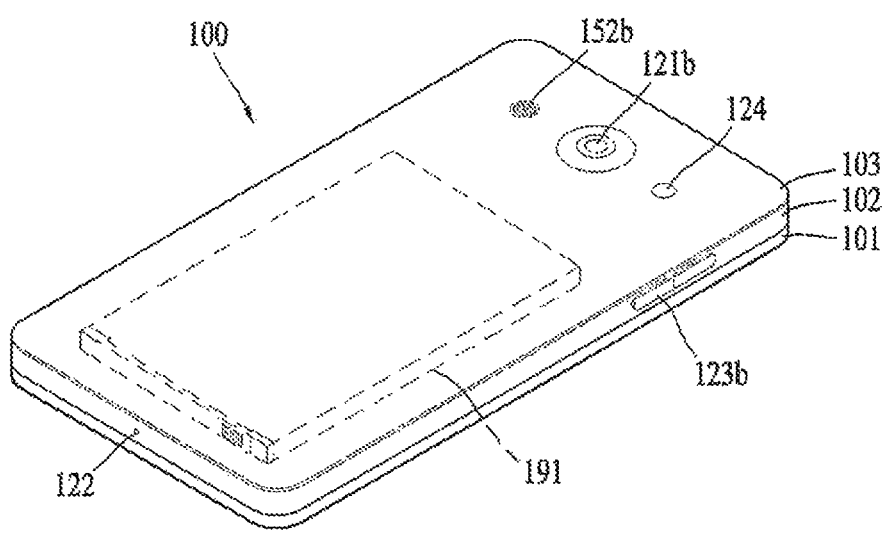

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
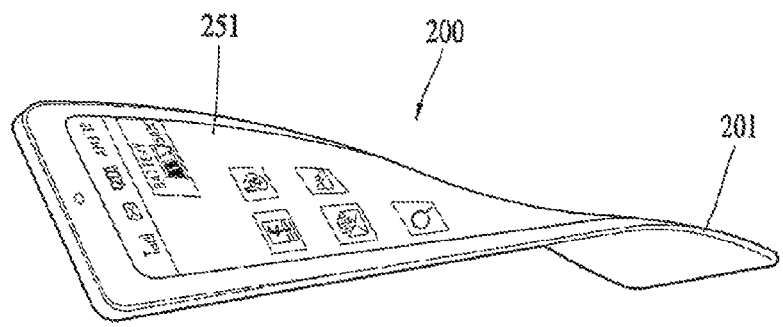
FIG. 2 is a conceptual view of a deformable mobile terminal according to an alternative embodiment of the present disclosure.

FIG. 2 is a conceptual view of a deformable mobile terminal according to an alternative embodiment of the present disclosure. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
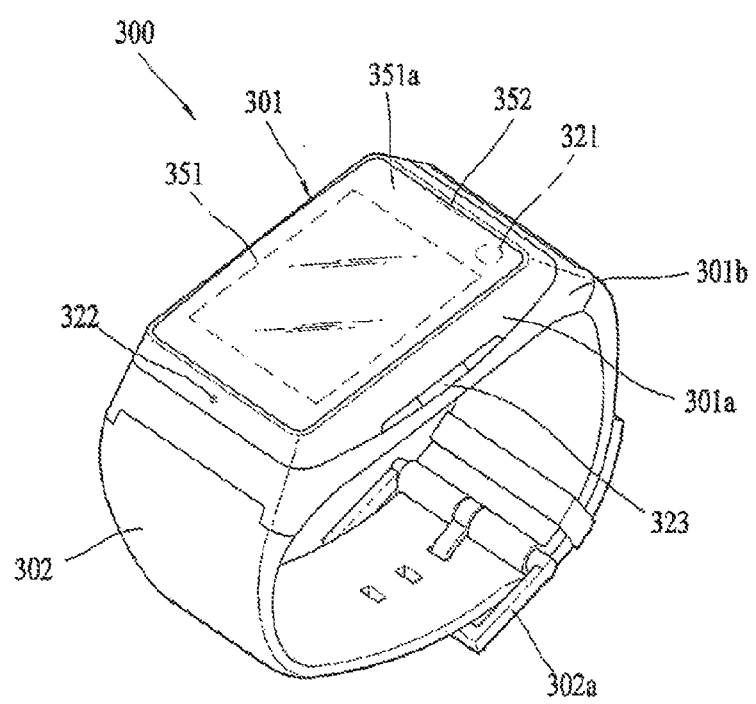
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
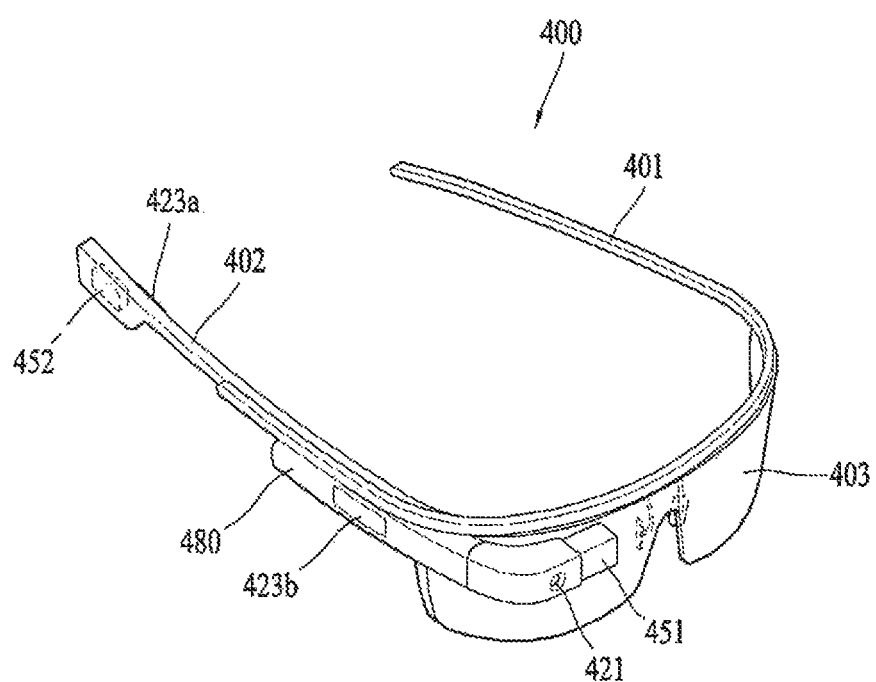
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Further preferred embodiments will be described in more detail with reference to additional drawing figures. It is understood by those skilled in the art that the present features can be embodied in several forms without departing from the characteristics thereof.

In the following, embodiments of the present disclosure are explained with reference to FIGS. 5 to 21. In order to explain and understand the embodiments of the present disclosure, it may refer to contents mentioned earlier in FIGS. 1 to 4. And, the aforementioned mobile terminal may correspond to a mobile terminal according to one embodiment of the present disclosure.

Figure 5:
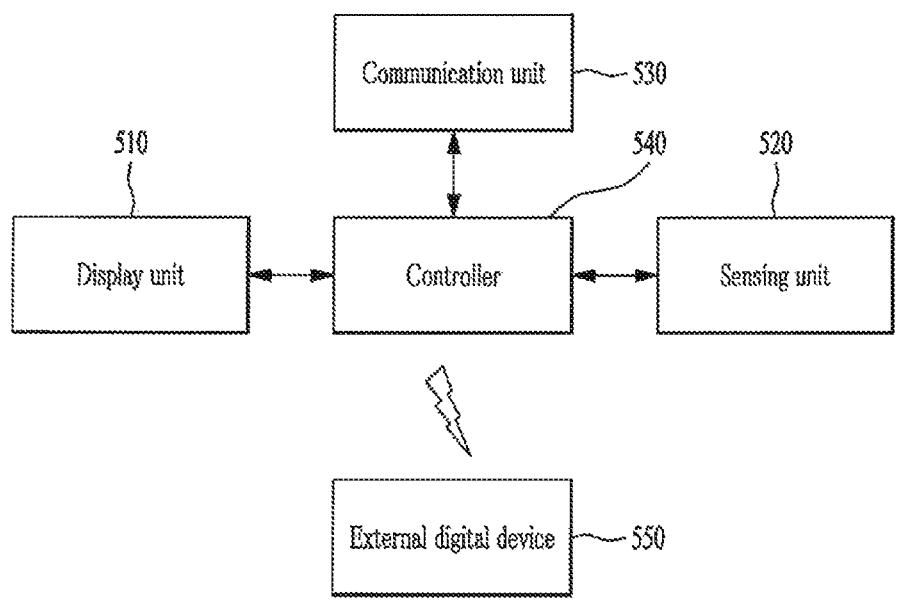
FIG. 5 is a block diagram for configuration modules of a mobile terminal according to one embodiment of the present disclosure.

FIG. 5 is a block diagram for configuration modules of a mobile terminal according to one embodiment of the present disclosure.

A mobile terminal according to one embodiment of the present disclosure can include a display unit 510, sensing unit 520, a communication unit 530, a controller 540 and the like. The configuration modules shown in FIG. 5 and other configuration modules not shown in FIG. 5 may refer to FIGS. 1 to 4.

The display unit 510 can display visual information. In this case, the visual information may include contents, an application, an image, a video and the like. And, the display unit 510 can output the visual information on a screen based on a control command of the controller 540. In the present disclosure, the display unit 510 can be implemented by the display unit 151 depicted in FIG. 1a.

The sensing unit 520 senses various inputs of a user and environment of a mobile terminal and may be able to deliver a sensed result to the controller 540 to enable the controller to perform an operation in accordance with the sensed result.

In the present disclosure, the sensing unit 520 can be implemented by the sensing unit 140 depicted in FIG. 1a.

The communication unit 530 performs communication with an external device using various protocols and may be able to transceive data with the external digital device. And, the communication unit 530 accesses a network in wired and wireless and may be able to transmit and receive digital data such as contents and the like. In the present disclosure, the communication unit 530 can be implemented by the short-range communication module 114 depicted in FIG. 1a. As an embodiment, the communication unit 530 can receive a signal indicating a use mode of an external digital device 550 from the external digital device 550.

The controller 540 processes data, controls each unit of the aforementioned mobile terminal and may be able to control transmission and reception of data between units. In the present disclosure, the controller 540 can be implemented by the controller 180 depicted in FIG. 1a.

According to one embodiment, if a first input signal is sensed in a state that the display unit 510 is inactivated, the controller 540 can enter a first unlock mode. If a first input signal is sensed in a state that the display unit 510 is activated, the controller 540 can enter a second unlock mode. According to a different embodiment, if first input signal is sensed in a predetermined area of the display unit 510, the controller 540 can enter the first unlock mode. And, if a first input signal is sensed in an area except the predetermined area of the display unit 510, the controller 540 can enter the second unlock mode. According to a different embodiment, the controller 540 can receive a first signal indicating a first use mode or a second signal indicating a second use mode from an external digital device. If the first signal is received from the external digital device and a first input signal inputted on the display unit 540 is sensed, the controller 540 can enter the first unlock mode. And, if the second signal is received from the external digital device and a first input signal inputted on the display unit 540 is sensed, the controller 540 can enter the second unlock mode.

As one embodiment of the present disclosure, operations performed by the mobile terminal can be controlled by the controller 540. For clarity, it is commonly explained as the operations controlled by the controller are performed/controlled by the mobile terminal in the following drawing and explanation.

An external digital device 550 may correspond to a digital device capable of performing communication access with a mobile terminal. For instance, the external digital device 550 may be able to include a watch-type terminal depicted in FIG. 3 and a glass-type terminal depicted in FIG. 4. For instance, the external digital device 550 can include a band-type terminal capable of communicating with a mobile terminal 100, a drone, and the like. In case of performing pairing between the mobile terminal and the external digital device 550, the mobile terminal and the external digital device 500 perform communication access and may be then able to bi-directionally transmit and receive data. The pairing can be performed via Bluetooth, NFC (near filed communication), and the like. In the present disclosure, assume a state that the mobile terminal is paired with the external digital device 550. Regarding this, it shall be described later with reference to FIG. 16.

Meanwhile, the mobile terminal can include various use modes. For instance, the mobile terminal can include an unlock mode and a lock mode. In general, the unlock mode indicates a mode that a user is able to use an application, contents, a video and the like included in the mobile terminal when the display unit is activated. In the present disclosure, the mobile terminal can include a first unlock mode and a second unlock mode. In this case, at least a part between contents provided in the first unlock mode and contents provided in the second unlock mode may be different from each other. Regarding this, it shall be explained later with reference to FIGS. 6 to 9.

And, the lock mode indicates a mode incapable of using an application, contents and the like included in the mobile terminal via the display unit. And, the lock mode includes both an activated state of the display unit and an inactivated state of the display unit. Meanwhile, if an event providing a notification occurs in the lock mode, the mobile terminal can provide the notification on the display unit. Meanwhile, in the present disclosure, the mobile terminal can include a first lock mode and a second lock mode. In this case, the first lock mode is a lock mode corresponding to the aforementioned first unlock mode and the second lock mode is a lock mode corresponding to the aforementioned second unlock mode. Regarding this, it shall be described later with reference to FIG. 18.

FIGS. 6 to 9 are diagrams for explaining an example of a first unlock mode and a second unlock mode of a mobile terminal according to one embodiment of the present disclosure.

As mentioned in the foregoing description, the unlock mode corresponds to a mode that a user is able to use an application, contents, an image, a video and the like when the display unit is activated. In the following description, an application, contents, an image, a video and the like displayed on the display unit are commonly called as contents.

If contents are identically provided to users of the mobile terminal 100 in the unlock mode of the mobile terminal 100 irrespective of a user, privacy of an actual owner of the mobile terminal 100 may be invaded. Hence, it is necessary for the mobile terminal 100 to provide two or more unlock modes according to a user. In the present disclosure, the mobile terminal 100 can provide a first unlock mode and a second unlock mode. And, depending on a configuration, the mobile terminal 100 can variously provide more unlock modes.

Figure 6:
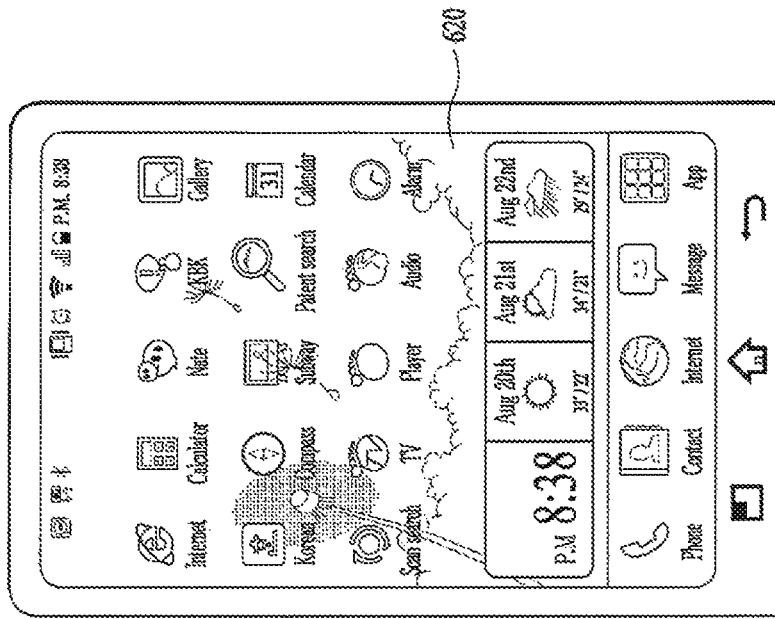
FIG. 6 is a diagram for explaining an example of a first unlock mode and a second unlock mode of a mobile terminal according to one embodiment of the present disclosure.
Figure 6:
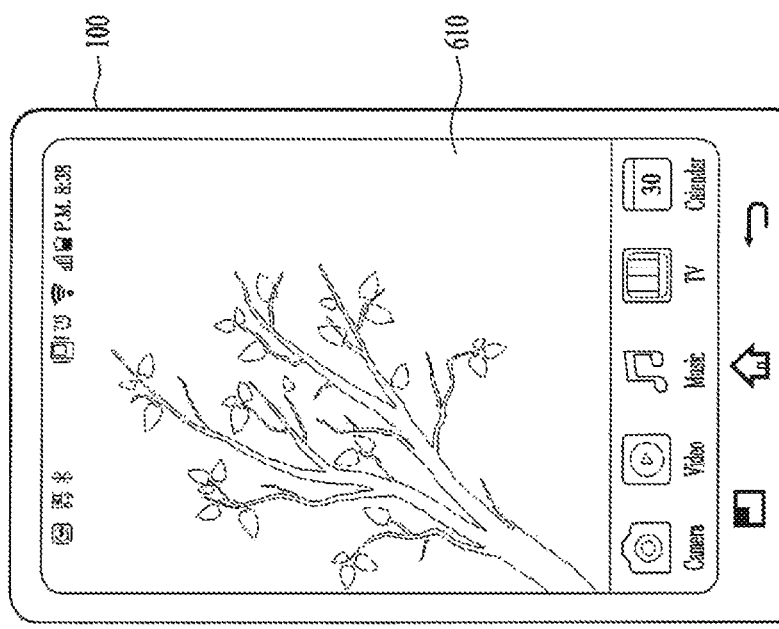

As an example, referring to FIG. 6, the mobile terminal 100 can provide a first unlock mode 610 to a user not corresponding to an owner of the mobile terminal 100 and a second unlock mode 620 to the owner of the mobile terminal 100. For instance, the first unlock mode 610 may correspond to a mode providing contents not invading privacy of the owner of the mobile terminal 100 to a user of the mobile terminal. Referring to FIG. 6 (a), the mobile terminal 100 can provide a camera application, a video application, a TV application and the like on the display unit in the first unlock mode 610.

And, the second unlock mode 620 corresponds to a mode providing all contents in which the privacy of the owner of the mobile terminal 100 is included. The second unlock mode may correspond to a mode providing contents used for utilizing the mobile terminal 100 by the owner. Referring to FIG. 6 (b), unlike the first unlock mode 610, the second unlock mode 620 can provide contents in which such a privacy as a phone call, a contact list, a messenger and the like is included to a user.

Figure 7:
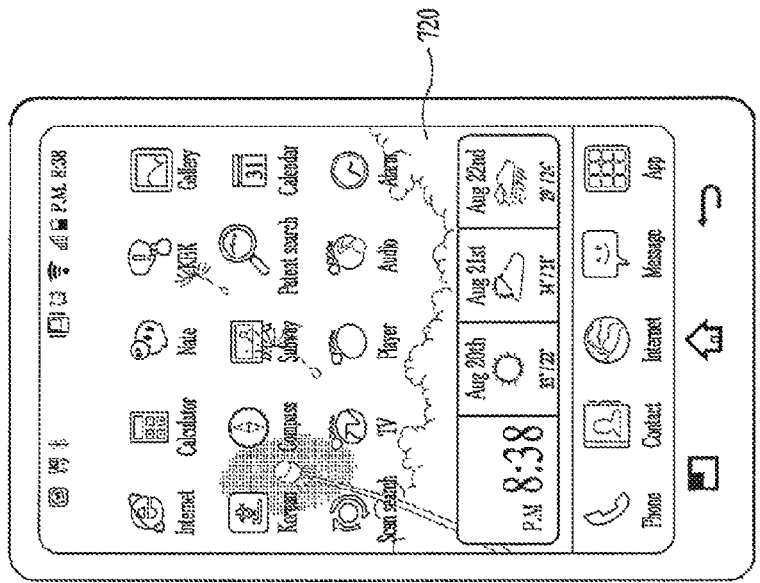
FIG. 7 is a diagram for explaining an example of a first unlock mode and a second unlock mode of a mobile terminal according to one embodiment of the present disclosure.
Figure 7:
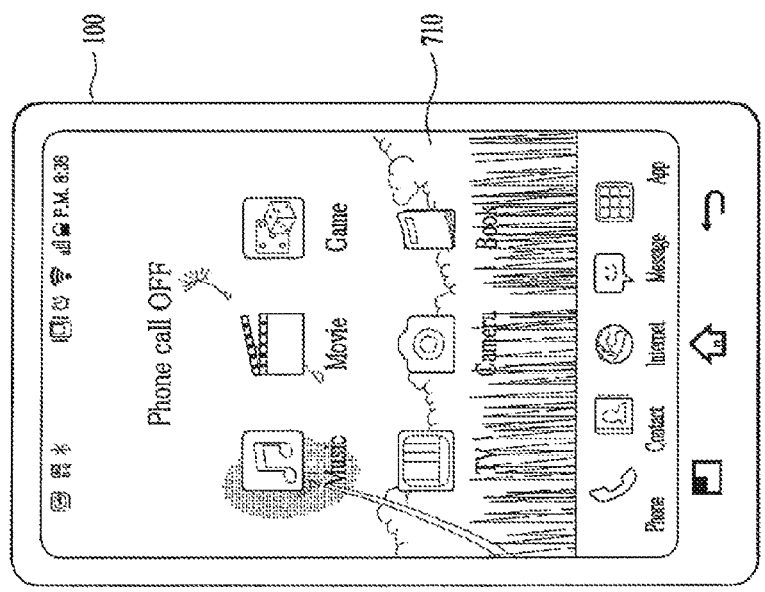

As a different example, referring to FIG. 7, the mobile terminal 100 can provide a first unlock mode 710 provided when a user take a rest and a second unlock mode 720 provided when the user is in daily life. For instance, if a user wants to take a rest in a manner of getting out of business, the first unlock mode 710 may correspond to a mode blocking a phone call, a message and the like capable of interrupting the rest of the user and providing contents capable of being used in the middle of the rest of the user only. Referring to FIG. 7 (a), the mobile terminal 100 switches a phone call to a state of not receiving the phone call and may be able to provide such an application related to the rest of the user as music, a movie, a game, a TV and the like to the user in the first unlock mode 710.

And, the second unlock mode 720 may correspond to a mode providing contents used in a daily life of the user such as business and the like instead of the rest of the user to the user. Referring to FIG. 7 (b), similar to the second unlock mode 620 depicted in FIG. 6 (b), the second unlock mode 720 can provide various contents to the user.

Figure 8:
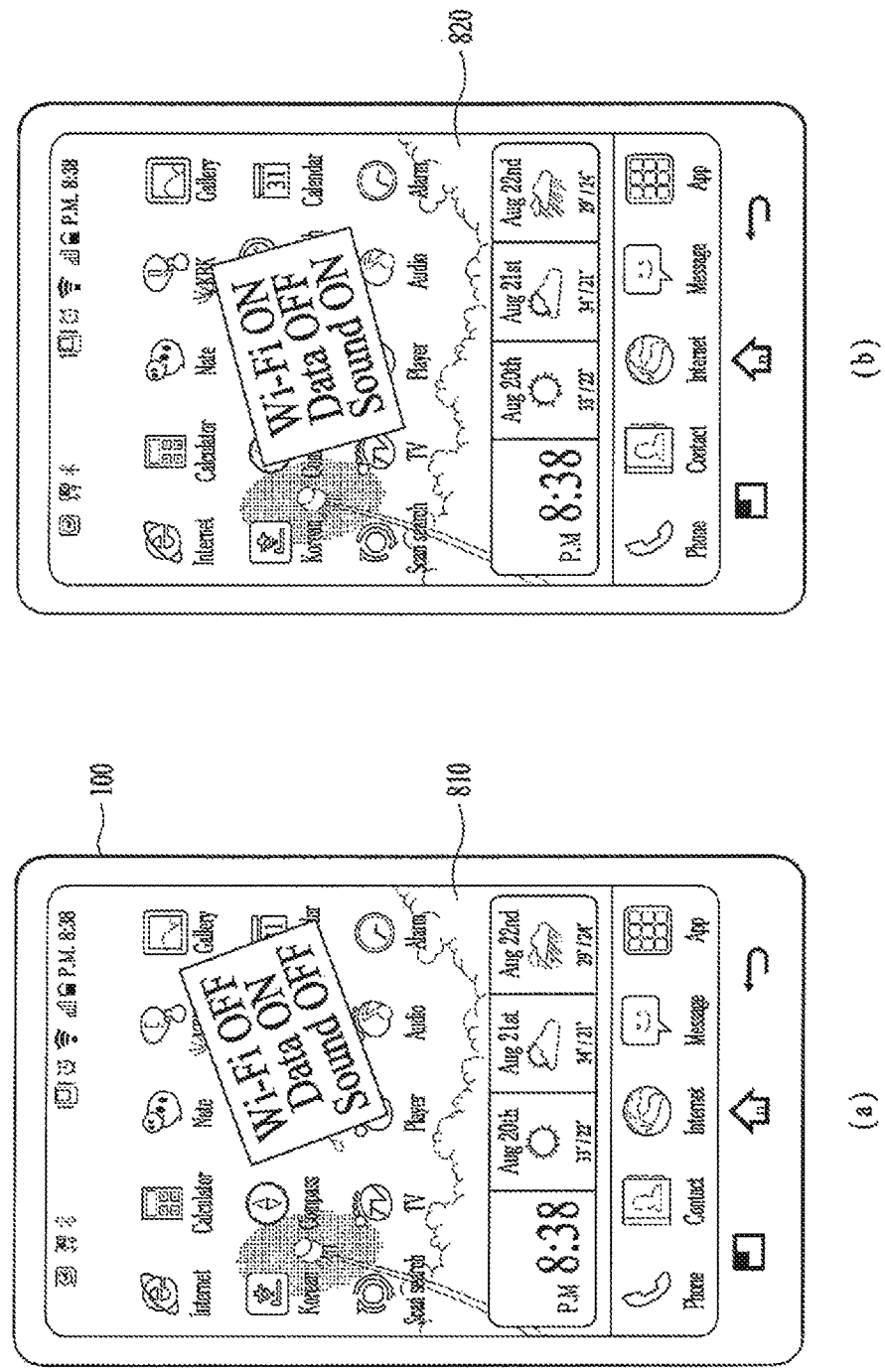
FIG. 8 is a diagram for explaining an example of a first unlock mode and a second unlock mode of a mobile terminal according to one embodiment of the present disclosure.

As a different example, referring to FIG. 8, the mobile terminal 100 can provide a first unlock mode 810 provided when a user is positioned at the outside of home and a second unlock mode 820 provided when the user is positioned at the inside of home. When the user is positioned at the inside of home or is positioned at the outside of home, the first unlock mode 810 or the second unlock mode 820 may correspond to a mode determined according to a method of using data of the mobile terminal 100 and whether sound is provided.

Referring to FIG. 8 (a), when a user is positioned at the outside, the first unlock mode 810 may correspond to a mode blocking Wi-Fi of the mobile terminal 100, permitting to use data and not providing sound. Referring to FIG. 8 (b), when a user is positioned at the inside of home, the second unlock mode 820 may correspond to a mode blocking the use of data of the mobile terminal 100, permitting the use of Wi-Fi and providing sound. Yet, according to the present embodiment, the first unlock mode or the second unlock mode can be provided in various ways according to not only a method of using data and whether sound is provided but also a pattern of using the mobile terminal of a user.

Figure 9:
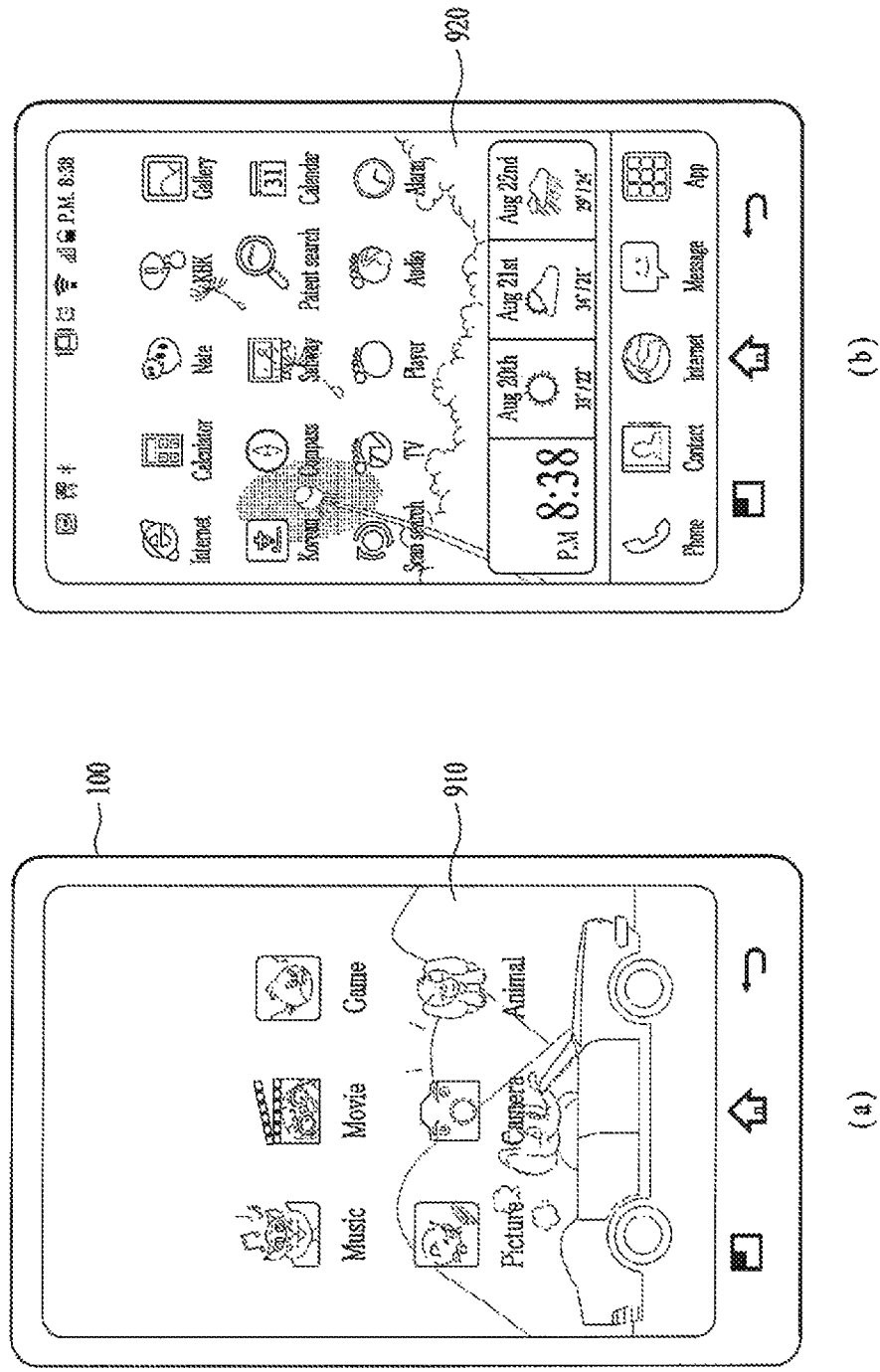
FIG. 9 is a diagram for explaining an example of a first unlock mode and a second unlock mode of a mobile terminal according to one embodiment of the present disclosure.

As a different example, referring to FIG. 9, the mobile terminal 100 can provide a first unlock mode 910 provided when a user corresponds to a kid and a second unlock mode 920 provided when a user corresponds to an adult. For instance, if a user corresponds to a kid, the first unlock mode 910 can provide contents capable of being used by the kid only to the kid in a manner of excluding contents not accessible by the kid from the contents. For instance, referring to FIG. 9 (a), the first unlock mode 910 can provide an animation full of child interest, music, a children's song, a camera application and the like to the kid.

The second unlock mode 920 can provide a user with contents capable of being used by the user only when the user corresponds to an adult. For instance, referring to FIG. 9 (b), similar to the second unlock mode 620 depicted in FIG. 6 (b), the second unlock mode 920 can provide various contents usable by an adult user.

The first unlock mode and the second unlock mode provided by the present disclosure may be non-limited by the embodiments mentioned earlier in FIGS. 6 to 9. In particular, the mobile terminal can provide various unlock modes based on a user using the mobile terminal, a position at which the mobile terminal is positioned, time, a location, and the like. Besides the aforementioned first unlock mode and the second unlock mode, the mobile terminal can provide an additional unlock mode such as a third unlock mode.

Meanwhile, in order to use the first and the second unlock mode mentioned earlier in FIGS. 6 to 9, it is necessary for the mobile terminal to switch to an unlock mode from a lock mode. As mentioned in the foregoing description, the lock mode corresponds to a state that a user is unable to use contents. The lock mode can include a state that the display unit of the mobile terminal is activated and a state that the display unit of the mobile terminal is inactivated.

Figure 10:
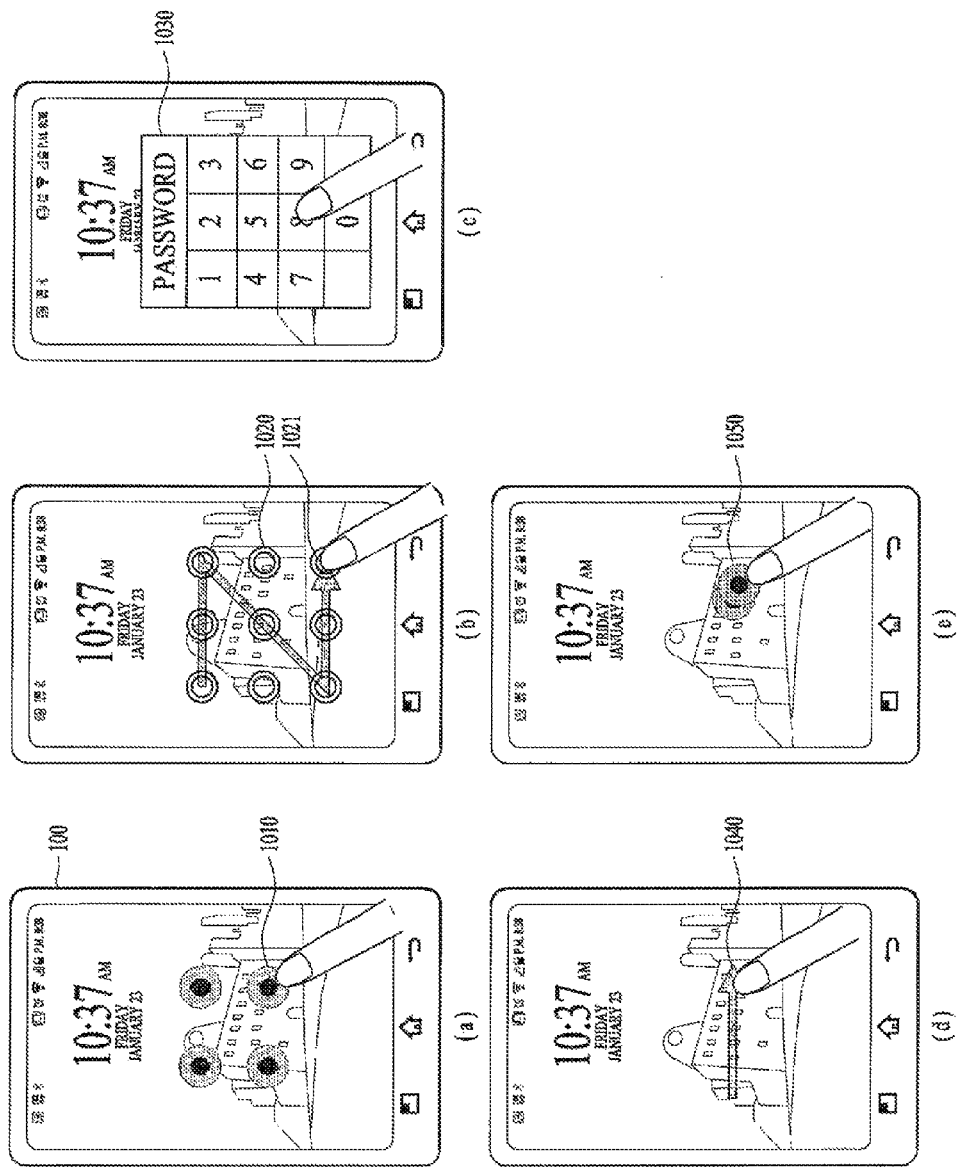
FIG. 10 is a diagram for explaining an example of a screen displaying an unlock mode in a state that a display unit of a mobile terminal is activated according to one embodiment of the present disclosure.

FIG. 10 is a diagram for explaining an example of a screen displaying an unlock mode in a state that a display unit of a mobile terminal is activated according to one embodiment of the present disclosure.

First of all, the mobile terminal 100 can enter an unlock mode from a lock mode to use contents. In this case, the mobile terminal 100 can indicate that the mobile terminal 100 is in the lock mode by displaying a screen indicating the lock mode (hereinafter, 'a lock screen') on the display unit. In this case, in order to enter the unlock mode, the mobile terminal 100 can sense an input signal in a manner of displaying an unlock interface on the lock screen or sense an input signal without displaying the unlock interface.

As an example, if the mobile terminal 100 displays the unlock interface on the lock screen and senses a predetermined password, the mobile terminal can enter the unlock mode. In this case, the unlock interface corresponds to an interface used for unlocking the mobile terminal 100. If a predetermined password configured by a user in advance is recognized, the unlock interface can release the unlock mode. In this case, the predetermined password can include a drag touch input including a pattern, a multi touch input including a pattern, a password consisting of numbers and the like according to a type of the unlock interface. And, the unlock interface can be displayed on a certain area of the display unit.

For instance, referring to an example shown in FIG. 10 (a), an unlock interface 1010 may correspond to an interface recognizing a plurality of touch inputs inputted on the display unit according to a predetermined order. For instance, a plurality of the touch inputs set to the unlock interface 1010 may correspond to touch inputs sensed on at least a part of the display unit according to the predetermined order. Referring to FIG. 10 (a), the mobile terminal 100 can recognize an input contiguously sensed on the display unit 4 times in an order of 1 to 4 as an input signal.

For instance, referring to an example of FIG. 10 (b), an unlock interface 1020 may correspond to an interface recognizing a drag touch input that forms a pattern on the display unit. For instance, the drag touch input set to the unlock interface 1020 may correspond to an input drawing a predetermined pattern. Referring to FIG. 10 (b), the mobile terminal 100 can recognize a drag touch input 1021 drawing a 'Z' pattern on the display unit as an input signal.

For instance, referring to FIG. 10 (c), an unlock interface 1030 may correspond to an interface recognizing a password consisting of numbers. For instance, a number password set to the unlock interface 1030 may correspond to a touch input inputting predetermined numbers. Meanwhile, besides the embodiments depicted in FIG. 10, the unlock interface can be configured in various ways.

Meanwhile, as a different embodiment, if an input signal is sensed on the lock screen, the mobile terminal 100 can enter the unlock mode. In this case, unlike the aforementioned unlock interface, the mobile terminal 100 can recognize the input signal irrespective of a specific area of the display unit. For instance, as shown in FIG. 10 (d), if a sliding input is sensed on the lock screen, the mobile terminal 100 can enter the unlock mode. And, for instance, as shown in FIG. 10 (e), if a multi touch input is sensed on the lock screen, the mobile terminal 100 can enter the unlock mode. Besides, various methods can be provided to make the mobile terminal 100 enter the unlock mode from the lock mode without using the unlock interface.

In the following embodiments explained with reference to FIGS. 11 to 16, a method for a mobile terminal to provide a plurality of unlock modes using a single input signal in the aforementioned lock mode is explained. Meanwhile, a first unlock mode and a second unlock mode described in FIGS. 11 to 16 may correspond to the embodiment mentioned earlier in FIG. 6. Yet, the first unlock mode and the second unlock mode may be non-limited to the aforementioned embodiment. It may also be able to apply the embodiments mentioned earlier in FIGS. 7 to 9 and a different embodiment.

FIG. 11 is a diagram for explaining an example of a method of entering an unlock mode from a lock mode of a mobile terminal according to one embodiment of the present disclosure.

An embodiment of FIG. 11 shows a method of entering a plurality of unlock modes according to whether a display unit is activated in a lock mode. In FIG. 11, a method of releasing a lock mode may correspond to the method of inputting a plurality of touches according to a predetermined order among the methods mentioned earlier in FIG. 10. Yet, although it is depicted in FIG. 11, a screen lock can also be released by different methods mentioned earlier in FIG. 10.

Figure 11A:
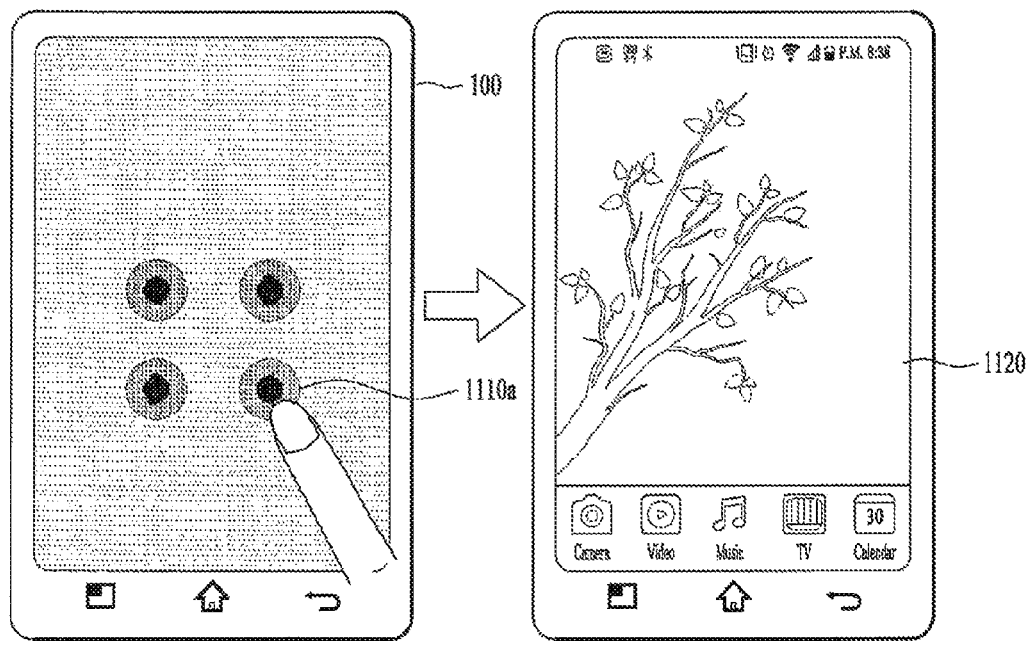
FIGS. 11A and 11B are diagrams for explaining an example of a method of entering an unlock mode from a lock mode of a mobile terminal according to one embodiment of the present disclosure.

As an embodiment, as shown in FIG. 11A, if a first input signal 1110a is sensed in a state that the display unit is inactivated, the mobile terminal 100 can enter a first unlock mode 1120. The state that the display unit is inactivated (or deactivated) corresponds to a state that power of the display unit is turned off or an image is not displayed on the display unit. Hence, the state may correspond to a state that no image is displayed on the display unit. In FIG. 11A, the first input signal 1110a may correspond to 4 touch inputs inputted according to a predetermined order. In the embodiment of FIG. 11A, an area of the display unit at which the first input signal 1110a is sensed may not be determined. Hence, if 4 touch inputs are sensed in accordance with a predetermined order irrespective of a position on the display unit, the mobile terminal 100 can recognize the touch inputs as the first input signal 1110a.

Meanwhile, if the first input signal 1110a is sensed in the state that the display unit is inactivated, the mobile terminal 100 can recognize it as a user intends to display a part of contents only on the display unit among the total contents. Hence, the mobile terminal can enter the first unlock mode 1120. In this case, the first unlock mode 1120 may correspond to a mode displaying partial contents only among the total contents. In particular, in case of using the mobile terminal in the first unlock mode 1120, an owner of the mobile terminal 100 may reduce possibility of privacy invasion of the owner invaded by a different user.

Figure 11B:
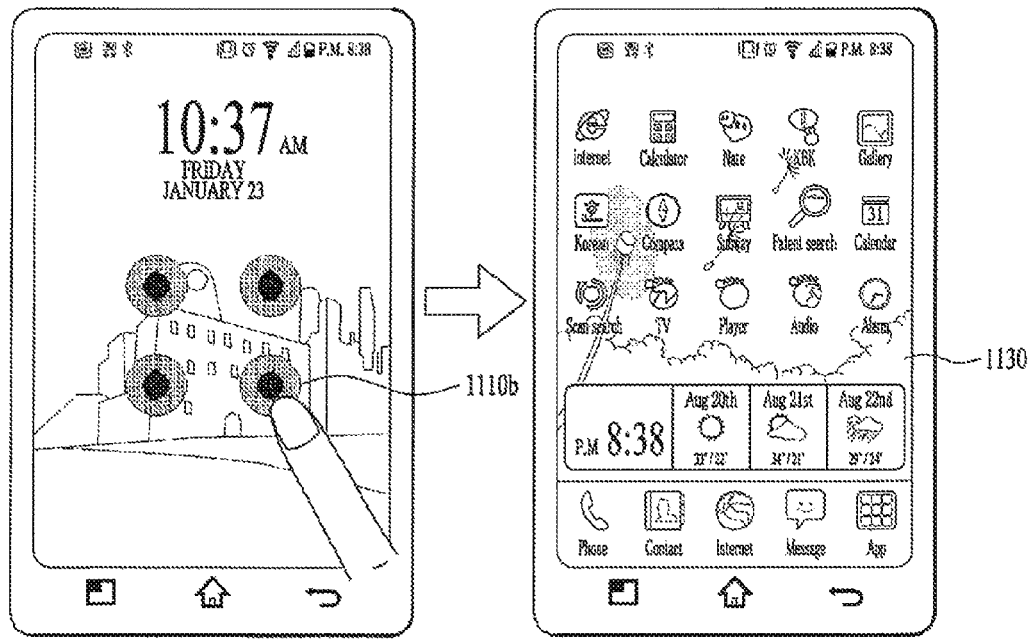

As a different embodiment, as shown in FIG. 11B, if a first input signal 1110b is sensed in a state that the display unit is activated, the mobile terminal 100 can enter a second unlock mode 1130. The state that the display unit is activated corresponds to a state that power of the display unit is turned on. Hence, the state may correspond to a state that a lock screen is displayed on the display unit. In FIG. 11B, the first input signal 1110b may correspond to 4 touch inputs inputted according to a predetermined order identical to the first input signal 1110a shown in FIG. 11A. In the embodiment of FIG. 11B, an area of the display unit at which the first input signal 1110b is sensed may not be determined. Hence, if 4 touch inputs are sensed on the display unit on which the lock screen is displayed in accordance with a predetermined order irrespective of a position on the display unit, the mobile terminal 100 can recognize the touch inputs as the first input signal 1110b.

Meanwhile, if the first input signal 1110b is sensed in the state that the display unit is activated, the mobile terminal 100 can recognize it as a user intends to display whole contents on the display unit. Hence, the mobile terminal 100 can enter the second unlock mode 1130. In this case, the second unlock mode 1130 may correspond to a mode displaying whole contents capable of being used in the mobile terminal 100. In particular, in case of using the mobile terminal in the second unlock mode 1130, a user of the mobile terminal 100 can use whole contents.

Meanwhile, a method of entering an unlock mode according to whether the display unit is activated may be non-limited by the embodiment of FIG. 11. For instance, unlike the embodiment of FIG. 11, if the first input signal is sensed in the state that the display unit is inactivated, the mobile terminal 100 can enter the second unlock mode. Moreover, if the first input signal is sensed in the state that the display unit is activated, the mobile terminal 100 can enter the first unlock mode.

According to the embodiments of FIG. 11, although a single input signal is set to the mobile terminal 100, a user can conveniently use a plurality of unlock modes according to whether the display unit is activated on the basis of timing of sensing an input signal.

FIG. 12 is a diagram for explaining an example of a method of entering an unlock mode from a lock mode of a mobile terminal according to one embodiment of the present disclosure.

An embodiment of FIG. 12 shows a method of entering a plurality of unlock modes according to whether an input signal is sensed on a predetermined area of the display unit in a state that a lock screen is displayed on the mobile terminal. A method of releasing the lock screen in FIG. 12 may correspond to the method of inputting a plurality of touches according to a predetermined order among the methods mentioned earlier in FIG. 10. Yet, although it is not depicted in FIG. 12, the lock screen can also be released by different methods mentioned earlier in FIG. 10. And, in the embodiment of FIG. 12, assume that the mobile terminal 100 senses a first input signal in a state that the display unit is activated.

Figure 12A:
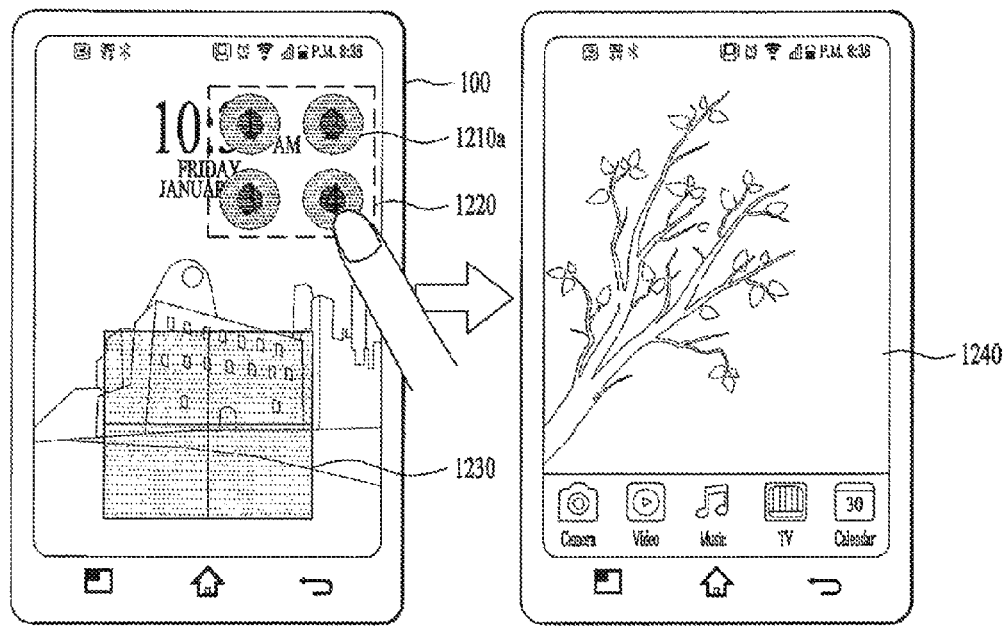
FIGS. 12A and 12B are diagrams for explaining an example of a method of entering an unlock mode from a lock mode of a mobile terminal according to one embodiment of the present disclosure.

As an embodiment, if a first input signal 1210a is sensed on a predetermined area of the display unit, the mobile terminal 100 can enter a first unlock mode 1240. In this case, the predetermined area 1220 may not be displayed on the display unit. In particular, the predetermined area 1220 may correspond to an area configured by a user with a position known to the user only. In FIG. 12A, the predetermined area 1220 corresponds to a partial part positioned at the upper right of the display unit. And, since the predetermined area 1220 is not displayed on the display unit, if the first input signal 1210a is sensed on an area in the vicinity of the predetermined area 1220, the mobile terminal 100 can recognize the first input signal as an input signal for unlock. And, in FIG. 12A, the first input signal 1210a may correspond to 4 touch inputs inputted according to a predetermined order.

If the first input signal 1210a is sensed on a predetermined area of the display unit, it may indicate a case that an area corresponding to a final position of the first input signal 1210a is included in the predetermined area. For instance, FIG. 12A shows a case that an area corresponding a $4^{th}$ touch input, which is a final position of the first input signal 1210*a*, is included in the predetermined area 1220 of the display unit.

Meanwhile, if the first input signal 1210*a* is sensed on the predetermined area 1210 of the display unit, the mobile terminal 100 can recognize it as a user intends to display partial contents among whole contents on the display unit. Hence, the mobile terminal 100 can enter the first unlock mode 1240.

As a different embodiment, if a first input signal 1210*b* is sensed on an area except a predetermined area 1220 of the display unit, the mobile terminal 100 can enter a second unlock mode 1250. In this case, referring to FIG. 12B, the area except the predetermined area 1220 may correspond to an area on which the unlock interface 1230 is displayed in the display unit. And, the area except the predetermined area 1220 can include remaining area including the area on which the unlock interface is displayed.

Meanwhile, the first input signal 1210*b* may correspond to a signal for the area on which the unlock interface 1230 is displayed. And, in FIG. 12B, the first input signal 1210*b* corresponds to 4 touch inputs inputted according to a predetermined order and may correspond to an input signal identical to the first input signal 1210*a* depicted in FIG. 12A. Hence, if the 4 touch inputs are sensed on 4 input windows displayed on the unlock interface 1230 according to the predetermined order, the mobile terminal 100 can recognize it as the first input signal 1210*b*.

Figure 12B:
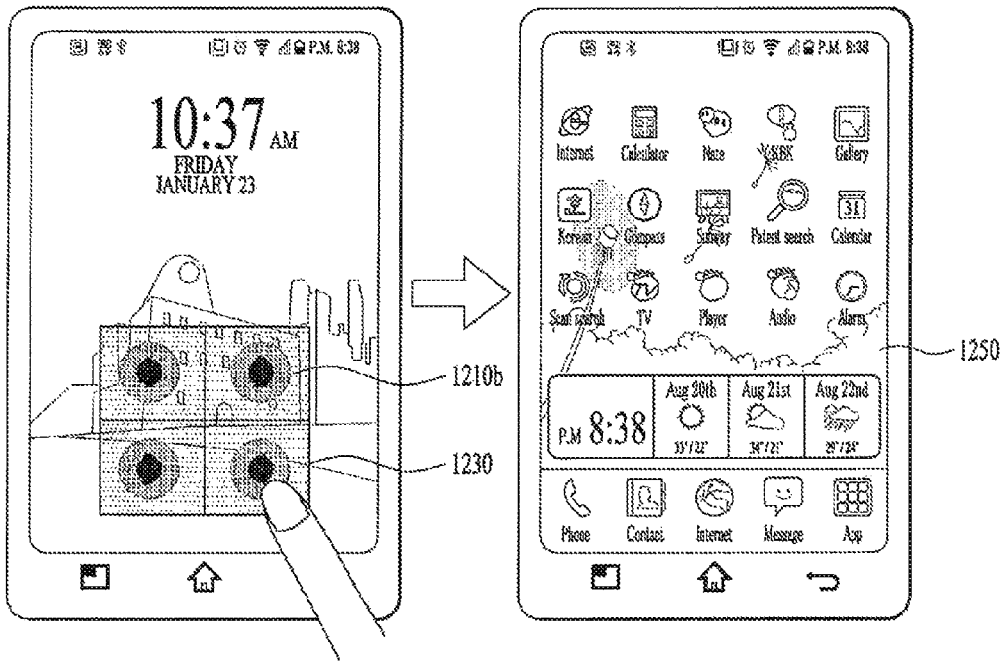

If the first input signal 1210*b* is sensed on the area except the predetermined area of the display unit, it may indicate a case that an area corresponding to a final position of the first input signal 1210*b* is included in the area except the predetermined area. For instance, FIG. 12B shows a case that an area corresponding a 4th touch input, which is a final position of the first input signal 1210*b*, is included in the area except the predetermined area of the display unit.

Meanwhile, if the first input signal 1210*b* is sensed on the unlock interface 1230, the mobile terminal 100 can recognize it as a user intends to display whole contents available in the mobile terminal. Hence, the mobile terminal 100 can enter the second unlock mode 1250.

Meanwhile, a method of entering an unlock mode according to whether an input signal is recognized on a predetermined area of the display unit may be non-limited by the embodiment of FIG. 12. For instance, unlike the embodiment of FIG. 12, if a first input signal is sensed on a predetermined area of the display unit, the mobile terminal can enter a second unlock mode. Moreover, if the first input signal is sensed on an unlock interface of the display unit, the mobile terminal 100 can enter a first unlock mode.

According to the embodiments of FIG. 12, a user can conveniently use a plurality of unlock modes according to whether an area of the display unit on which an input signal is sensed corresponds to an unlock interface capable of being recognized by the user or a predetermined area incapable of being recognized by the user.

FIG. 13 is a diagram for explaining an example of a method of entering an unlock mode from a lock mode of a mobile terminal according to one embodiment of the present disclosure.

An embodiment of FIG. 13 shows a method of entering a plurality of unlock modes according to whether an input signal is sensed on a predetermined area of the display unit in a state that a lock screen is displayed on the mobile terminal. A method of releasing the lock screen in FIG. 13 may correspond to the method of inputting a drag touch forming a pattern among the methods mentioned earlier in FIG. 10. Yet, although it is not depicted in FIG. 13, the lock screen can also be released by different methods mentioned earlier in FIG. 10. And, in the embodiment of FIG. 13, assume that the mobile terminal 100 senses a first input signal in a state that the display unit is activated. Explanation on parts overlapped with FIG. 12 is omitted at this time.

As an embodiment, if a first input signal 1310*a* is sensed on a predetermined area 1330 of the display unit, the mobile terminal 100 can enter a first unlock mode 1340. In this case, the predetermined area 1330 may not be displayed on the display unit. For instance, in FIG. 13A, the predetermined area 1330 may correspond to an area positioned at the lower right of the display unit. And, in FIG. 13A, the first input signal 1310*a* may correspond to a drag touch input forming a pattern.

Figure 13A:
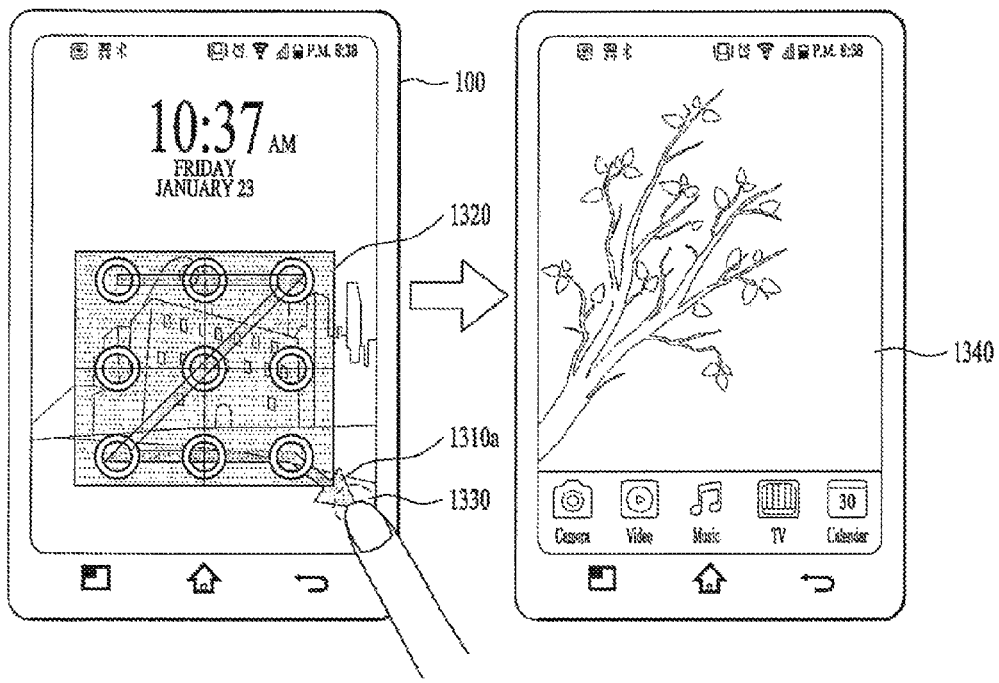
FIGS. 13A and 13B are diagrams for explaining an example of a method of entering an unlock mode from a lock mode of a mobile terminal according to one embodiment of the present disclosure.

Meanwhile, if an area corresponding to a final position of the first input signal 1310 is included in the predetermined area 1330, the mobile terminal can enter the first unlock mode 1340. In FIG. 13A, the first input signal 1310*a* corresponds to a drag touch of which a pattern of 'Z' form starts in the unlock interface 1320 and ends in the predetermined area 1330. Hence, the mobile terminal 100 can enter the first unlock mode 1340.

Figure 13B:
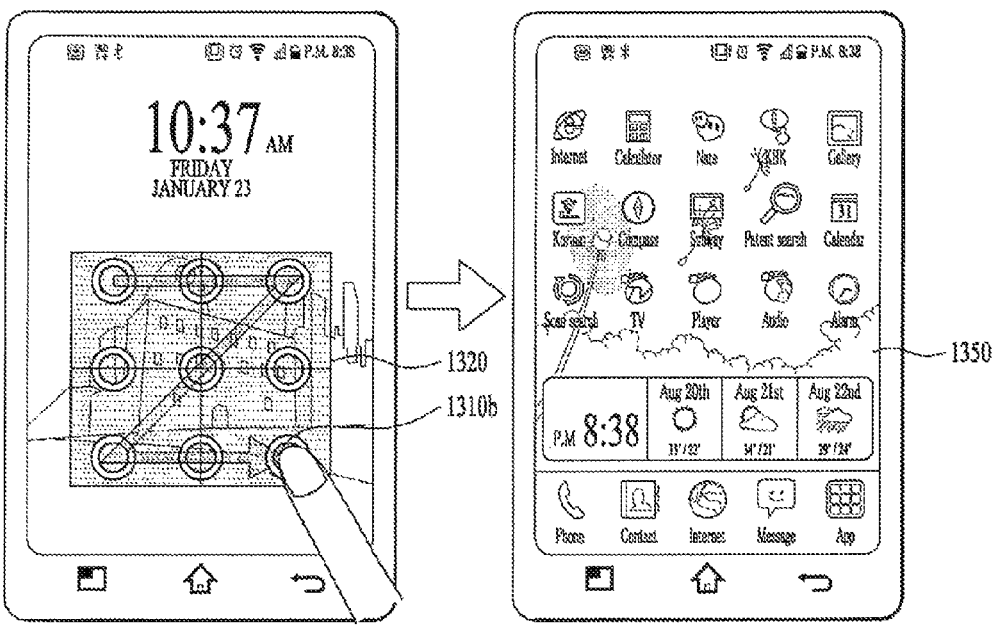

As a different embodiment, as shown in FIG. 13B, if a first input signal 1310*b* is sensed on an area except a predetermined area 1320 of the display unit, the mobile terminal 100 can enter a second unlock mode 1350. In this case, the area except the predetermined area 1320 may correspond to an area on which the unlock interface 1230 is displayed in the display unit. In FIG. 13B, the first input signal 1310*b* corresponds to a signal forming a pattern of 'Z' shape in the unlock interface 1320. In particular, the signal may correspond to an input signal forming a pattern identical to a pattern of the first input signal 1310*b* on the unlock interface 1320 shown in FIG. 13A. Hence, if the first input signal 1310*b* is sensed on the unlock interface 1320, the mobile terminal 100 can enter the second unlock mode 1350.

In particular, unlike the embodiment of FIG. 12, according to embodiment of FIG. 13, although the first input signal is identically sensed on the unlock interface, an unlock mode is determined according to whether an area corresponding to a final position of the input signal is the inside of the unlock interface. Meanwhile, a method of entering an unlock mode according to whether an input signal is recognized in a predetermined area of the display unit may be non-limited by the embodiment of FIG. 13. For instance, unlike the embodiment of FIG. 13, if a first input signal is sensed on a predetermined area of the display unit, the mobile terminal 100 can enter a second unlock mode. And, if the first input signal is sensed on an unlock interface of the display unit, the mobile terminal 100 can enter a first unlock mode.

Referring to the embodiment of FIG. 13, although a user performs an identical drag input on an unlock interface, the user can conveniently use a plurality of unlock modes according to whether a final position of the drag input is positioned on the unlock interface.

FIG. 14 is a diagram for explaining an example of a method of entering an unlock mode from a lock mode of a mobile terminal according to one embodiment of the present disclosure.

An embodiment of FIG. 14 shows a method of entering a plurality of unlock modes according to whether an input signal is sensed on a predetermined area of the display unit in a state that a lock screen is displayed on the mobile terminal. A method of releasing the lock screen in FIG. 14 may correspond to the method of inputting a sliding touch among the methods mentioned earlier in FIG. 10. Yet, although it is not depicted in FIG. 14, the lock screen can also be released by different methods mentioned earlier in FIG. 10. Meanwhile, unlike FIG. 12 and FIG. 13, an embodiment of FIG. 14 corresponds to a case that an unlock interface is not displayed on the lock screen.

Figure 14A:
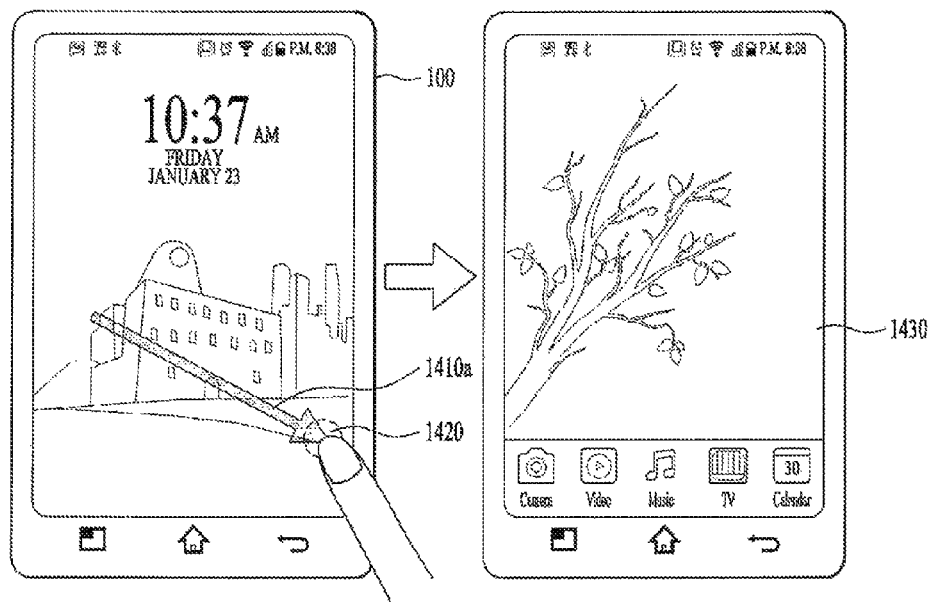
FIGS. 14A and 14B are diagrams for explaining an example of a method of entering an unlock mode from a lock mode of a mobile terminal according to one embodiment of the present disclosure.

As an embodiment, if a first input signal 1410a is sensed on a predetermined area 1420 of the display unit, the mobile terminal 100 can enter a first unlock mode 1430. More specifically, if an area corresponding to a final position of the first input signal 1410a is included in the predetermined area 1420 of the display unit, the mobile terminal 100 can enter the first unlock mode 1430. Referring to FIG. 14A, the first input signal 1410a corresponds to a sliding touch input starting at the left side of the display unit and ending at the predetermined area 1420 positioned at the lower right. If the sliding touch input ends at the predetermined area 1420, the mobile terminal 100 recognizes it as a user intent to limit access to contents and display only partial contents. Hence, the mobile terminal 100 can enter the first unlock mode 1430.

Figure 14B:
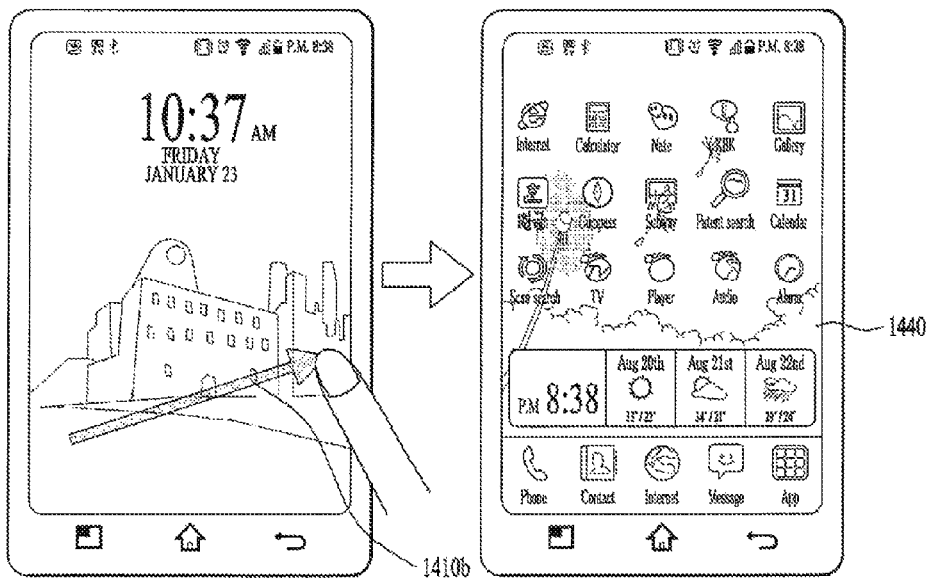

As a different embodiment, as shown in FIG. 14B, if a first input signal 1410b is sensed on an area except a predetermined area 1420, the mobile terminal 100 can enter a second unlock mode 1440. More specifically, if the first input signal 1410b is sensed on an area irrespective of the predetermined area 1420, the mobile terminal 100 can enter the second unlock mode 1440. In this case, the first input signal 1410b corresponds to a sliding touch input and may correspond to an input signal identical to the first input signal 1410a shown in FIG. 14A.

Meanwhile, a method of entering an unlock mode according to whether an input signal is sensed on a predetermined area of the display unit may be non-limited by the embodiments of FIG. 14. For instance, unlike the embodiments of FIG. 14, if a sliding touch input ending at a predetermined area of the display unit is sensed, the mobile terminal 100 can enter a second unlock mode. And, if a sliding touch input is sensed on an area except the predetermined area, the mobile terminal 100 can enter a first unlock mode.

According to the embodiments of FIG. 14, a user can conveniently use a plurality of unlock modes based on a position of an area at which a sliding touch input ends in response to a lock screen on which a unlock interface is not displayed.

FIG. 15 is a diagram for explaining an example of a method of entering an unlock mode in a state that a display unit of a mobile terminal is inactivated according to one embodiment of the present disclosure.

An embodiment of FIG. 15 shows a method of entering a plurality of unlock modes according to whether an input signal is sensed on a predetermined area 1520 of the display unit in a state that the display unit is inactivated. In FIG. 15, the method of entering an unlock mode corresponds to a multi touch. If two touches are sequentially sensed on an adjacent area, it is able to enter the unlock mode. According to the embodiment of FIG. 15, since the display unit is inactivated, the mobile terminal 100 is unable to display a lock screen.

Figure 15A:
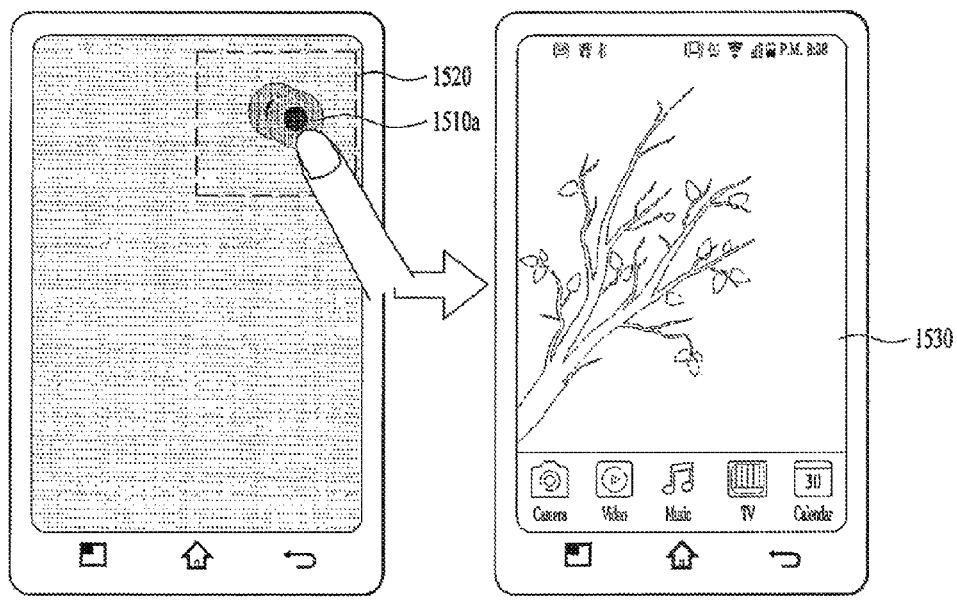
FIGS. 15A and 15B are diagrams for explaining an example of a method of entering an unlock mode in a state that a display unit of a mobile terminal is inactivated according to one embodiment of the present disclosure.

As an embodiment, as shown in FIG. 15A, if a first input signal 1510a is sensed on a predetermined area 1520 of the display unit, the mobile terminal 100 can enter a first unlock mode 1530. In this case, since the display unit is inactivated, the predetermined area 1520 may not be displayed. And, since the predetermined area 1520 is not displayed, if the first input signal 1510a is sensed on an area adjacent to the predetermined area 1520, the mobile terminal 100 can recognize the first input signal as an input signal configured to enter the unlock mode. In this case, the first input signal 1510a may correspond to sequential touch inputs sensed on an adjacent area as sequentially touched two touch inputs.

If the first input signal 1510a is sensed on the predetermined area 1520 in a state that the display unit is inactivated, the mobile terminal 100 can recognize it as a user intends to provide partial contents only among whole contents. Hence, the mobile terminal 100 can enter the first unlock mode 1530.

Figure 15B:
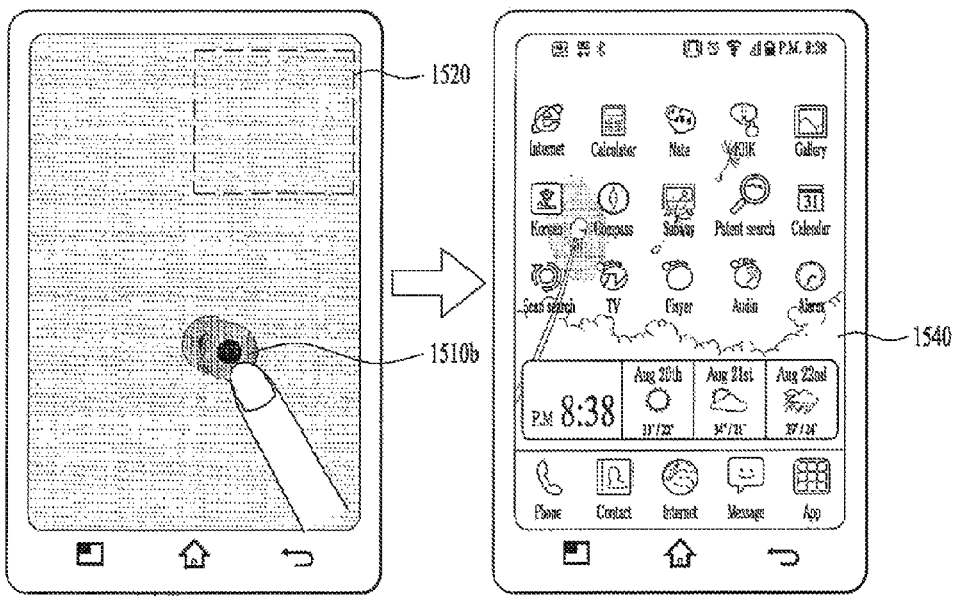

As a different embodiment, as shown in FIG. 15B, if a first input signal 1510b is sensed on an area except the predetermined area of the display unit, the mobile terminal 100 can enter a second unlock mode 1540. In this case, the first input signal 1510b may correspond to a sequentially touched signal of two touch inputs and the first input signal may correspond to an input signal identical to the first input signal shown in FIG. 15A.

If the first input signal 1510b is sensed on the area except the predetermined area 1520 in a state that the display unit is inactivated, the mobile terminal 100 can recognize it as a user intends to use all contents. Hence, the mobile terminal 100 can enter the second unlock mode 1540.

Meanwhile, a method of entering an unlock mode according to whether an input signal is sensed on a predetermined area of an inactivated display unit may be non-limited by the embodiment of FIG. 15. For instance, unlike FIG. 15, if a first input signal is sensed on a predetermined area of an inactivated display unit, the mobile terminal 100 can enter a second unlock mode. And, if the first input signal is sensed on an area except the predetermined area of the inactivated display unit, the mobile terminal 100 can enter a first unlock mode.

According to the embodiment of FIG. 15, a user can conveniently use a plurality of unlock modes according to an area of the display unit on which an input signal is sensed, although the display unit of the mobile terminal is inactivated.

FIG. 16 is a diagram for explaining an example of a method of entering an unlock mode in a state that a screen of a display unit is locked in a mobile terminal according to one embodiment of the present disclosure.

In an embodiment of FIG. 16, assume a state that a mobile terminal 100a is paired with an external digital device 100b. In FIG. 16, although the external digital device 100b corresponds to a watch-type terminal, the external device can include various terminals capable of performing communication access with a mobile terminal 100a such as a glass-type terminal, a drone and the like. In FIG. 16, a method of releasing a screen lock of the display unit corresponds to a method of inputting a plurality of touches according to a predetermined order among the methods mentioned earlier in FIG. 10. Yet, although it is not depicted in FIG. 16, the screen lock can be released by different methods mentioned earlier in FIG. 10. And, in FIG. 16, assume that the mobile terminal senses a first input signal 1610 in a state that the display unit is activated.

First of all, the mobile terminal 100a can receive a signal indicating a use mode of the external digital device 100b from the external digital device 100b. For instance, the use mode of the external digital device 100b can include a first use mode and a second use mode. In this case, the first use mode corresponds to a mode of the external digital device to which security is set. The first use mode corresponds to a mode providing a part of contents among whole contents. On the contrary, the second use mode corresponds to a mode of the external digital device from which security is released. The second use mode corresponds to a mode providing all contents capable of being used in the external digital device 100b. Hence, the mobile terminal can receive a first signal indicating the first use mode and a second signal indicating the second use mode of the external digital device 100b. The use modes may also be referred to herein as a security configuration mode in which security has been set to restrict access and a security release mode in which security has not been set and full access is enabled.

Figure 16A:
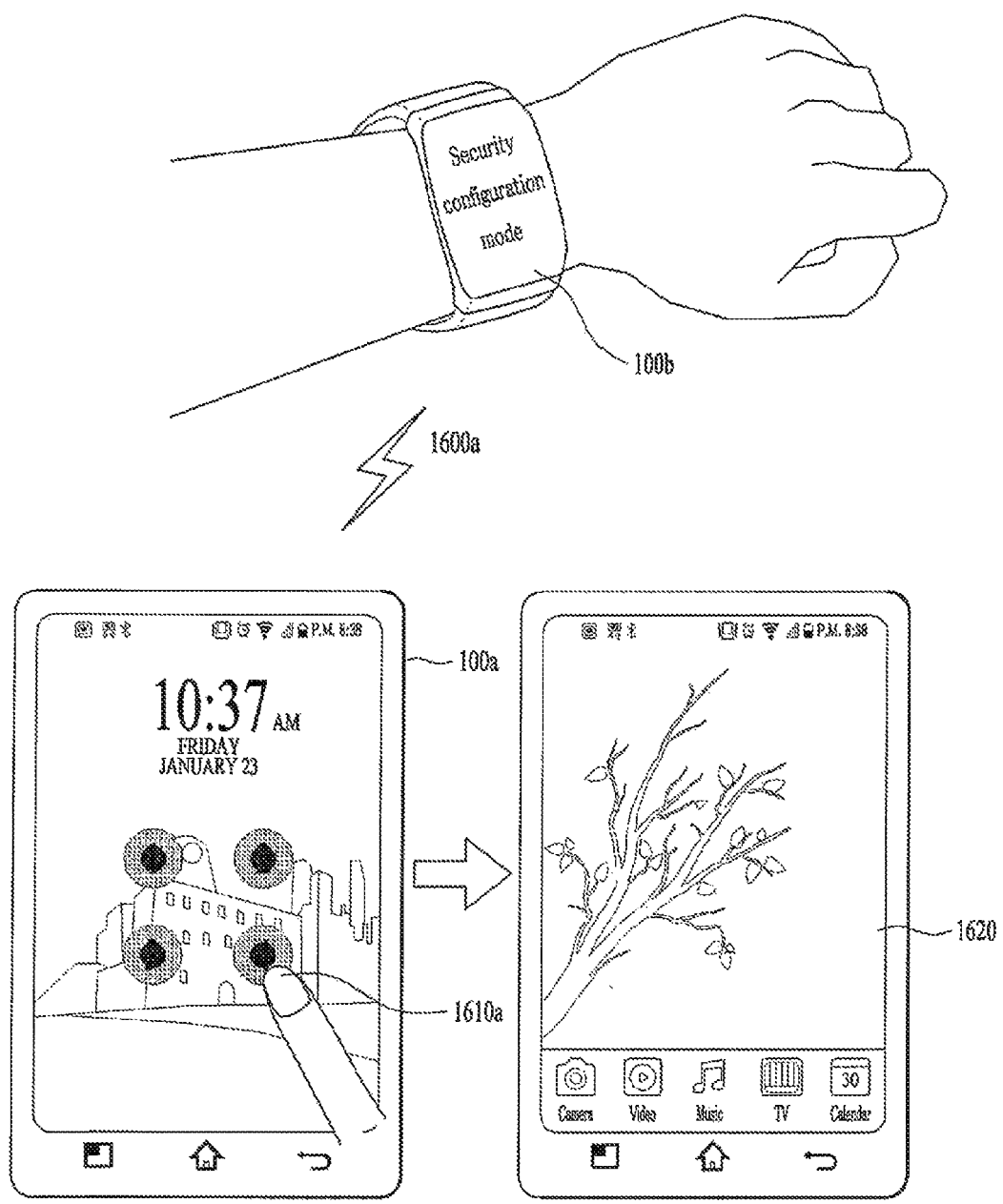
FIGS. 16A and 16B are diagrams for explaining an example of a method of entering an unlock mode in a state that a screen of a display unit is locked in a mobile terminal according to one embodiment of the present disclosure.

As an embodiment, as shown in FIG. 16A, if a first signal 1600a is received from the external digital device 100b and a first input signal 1610a is sensed on the display unit, the mobile terminal 100a can enter a first unlock mode 1620. In this case, the first input signal 1610a may correspond to 4 touch inputs inputted according to a predetermined order. And, the first input signal 1610a can include various touch inputs without being limited to the aforementioned touch input.

If security is set to the external digital device 100b, the mobile terminal 100a can recognize it as a user intends to provide partial contents only among whole contents on the display unit of the mobile terminal 100a. Hence, the mobile terminal can enter the first unlock mode 1620.

Figure 16B:
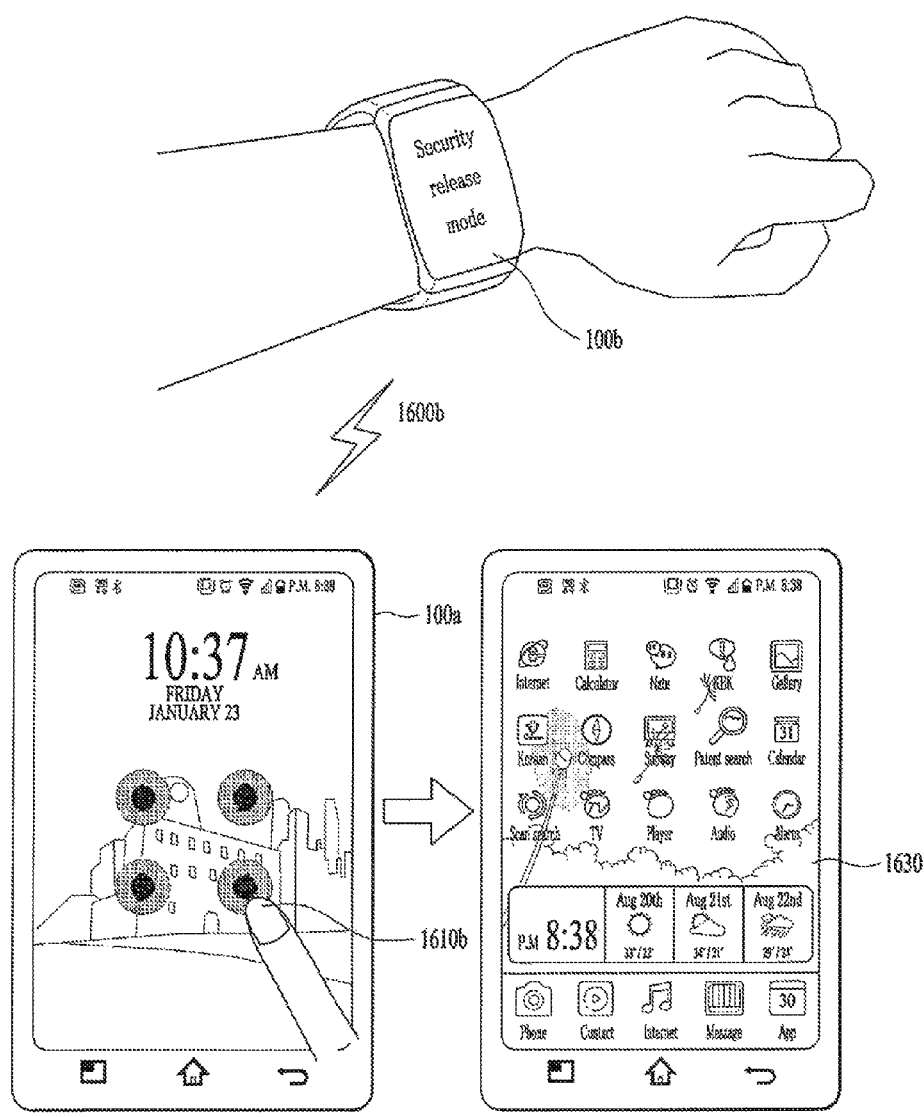

As a different embodiment, as shown in FIG. 16B, if a second signal 1600b is received from the external digital device 100b and a second input signal 1610b is sensed on the display unit, the mobile terminal 100a can enter a second unlock mode 1630. In this case, the first input signal 1610b may correspond to 4 touch inputs inputted according to a predetermined order. And, the first input signal 1610b may correspond to a signal identical to the first input signal 1610a mentioned earlier in FIG. 16A.

If security is released from the external digital device 100b, the mobile terminal 100a can recognize it as a user intends to provide all contents on the display unit of the mobile terminal 100a. Hence, the mobile terminal can enter the second unlock mode 1630.

Meanwhile, a method of entering an unlock mode of the mobile terminal 100a according to a use mode of the external digital device 100b may be non-limited to the embodiments mentioned in FIG. 16. For instance, unlike FIG. 16, if a first signal is received from the external digital device 100b and a first input signal is sensed on the display unit, the mobile terminal can enter a second unlock mode. And, if a second signal is received from the external digital device 100b and a first input signal is sensed on the display unit, the mobile terminal 100b can enter a first unlock mode.

According to the embodiment of FIG. 16, a user can conveniently use a plurality of unlock modes on a mobile terminal based on a use mode of an external device paired with the mobile terminal, although an input signal is inputted to the mobile terminal.

FIG. 17 is a diagram for explaining an example of a method of entering a different unlock mode in the middle of using a mobile terminal according to one embodiment of the present disclosure.

Unlike the aforementioned embodiments indicating that a screen of a mobile terminal 100 is locked or a display unit is inactivated, an embodiment of FIG. 17 shows a method of entering a different unlock mode while a user uses a first unlock mode or a second unlock mode. The first unlock mode and the second unlock mode described in the embodiment of FIG. 17 corresponds to the embodiment mentioned earlier in FIG. 6, by which the present disclosure may be non-limited. The first unlock mode and the second unlock mode described in the embodiment of FIG. 17 can also include the embodiments of FIGS. 7 to 9.

Figure 17A:
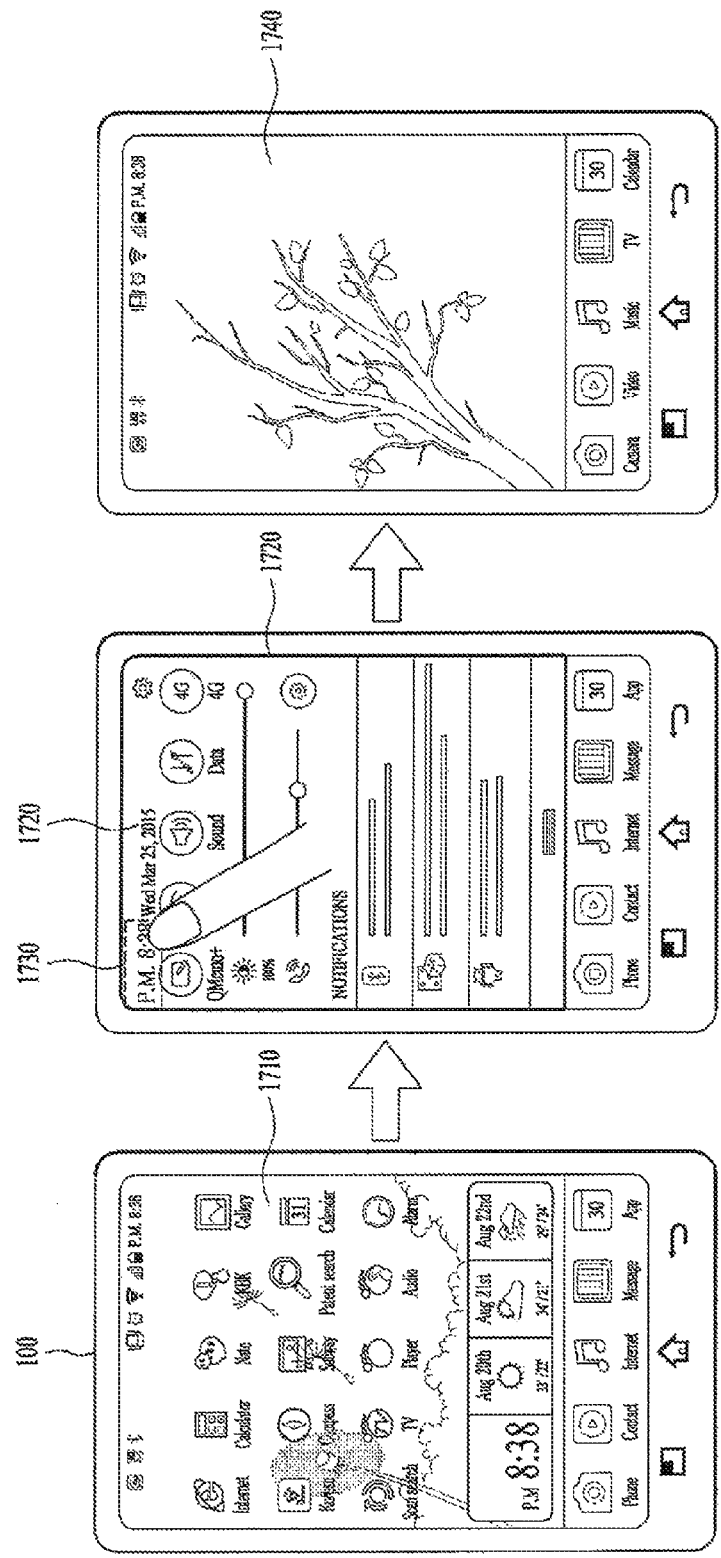
FIGS. 17A and 17B are diagrams for explaining an example of a method of entering a different unlock mode in the middle of using a mobile terminal according to one embodiment of the present disclosure.

As an embodiment, as shown in FIG. 17A, if a second input signal is sensed on a predetermined menu option 1730 in a second unlock mode 1710, the mobile terminal 100 can enter a first unlock mode 1740.

First of all, referring to a first drawing of FIG. 17A, the mobile terminal 100 can provide the second unlock mode 1710. A user using whole contents in the second unlock mode 1710 may want to change the mode to the first unlock mode 1740 in consideration of privacy invasion of a different user. In this case, referring to a second drawing of FIG. 17A, the mobile terminal 100 can sense a second input signal inputted on the predetermined menu option 1730.

For instance, the predetermined menu option 1730 can be displayed on a status bar 1720 of the mobile terminal 100. The status bar 1720 corresponds to a GUI (graphic user interface) indicating a current use of the mobile terminal 100 and can provide a user with time, Wi-Fi information, switching to vibration or silence, real time message check and the like. The predetermined menu option 1730 may correspond to a menu option including a separate function instead of a menu option displayed to change an unlock mode. For instance, in FIG. 17A, the predetermined menu option may correspond to a watch option. In particular, in FIG. 17A, the watch option can be used as a menu for changing an unlock mode as well as a function of indicating time.

If a separate menu option 1730 is displayed, since a different user instead of an owner of the mobile terminal 100 is able to easily switch a mode, it is difficult to protect privacy. Moreover, the predetermined menu option 1730 may correspond to a remaining menu option displayed on the status bar 1720 or a menu option displayed on the display unit in an unlock mode.

The second input signal may correspond to a long-touch input. For instance, if a short-touch input is sensed on the predetermined menu option 1730, the mobile terminal 100 can switch to a setting window for a watch option. For instance, if a long-touch input is sensed on the predetermined menu option 1730, the mobile terminal 100 can enter the first unlock mode 1740 from the second unlock mode 1710.

Subsequently, referring to a third drawing of FIG. 17A, if a second input signal is sensed on the predetermined menu option 1730, the mobile terminal can enter the first unlock mode 1740. In particular, by doing so, a user can promptly perform mode switching in the middle of using the mobile terminal and protect privacy of the user from an external user.

Figure 17B:
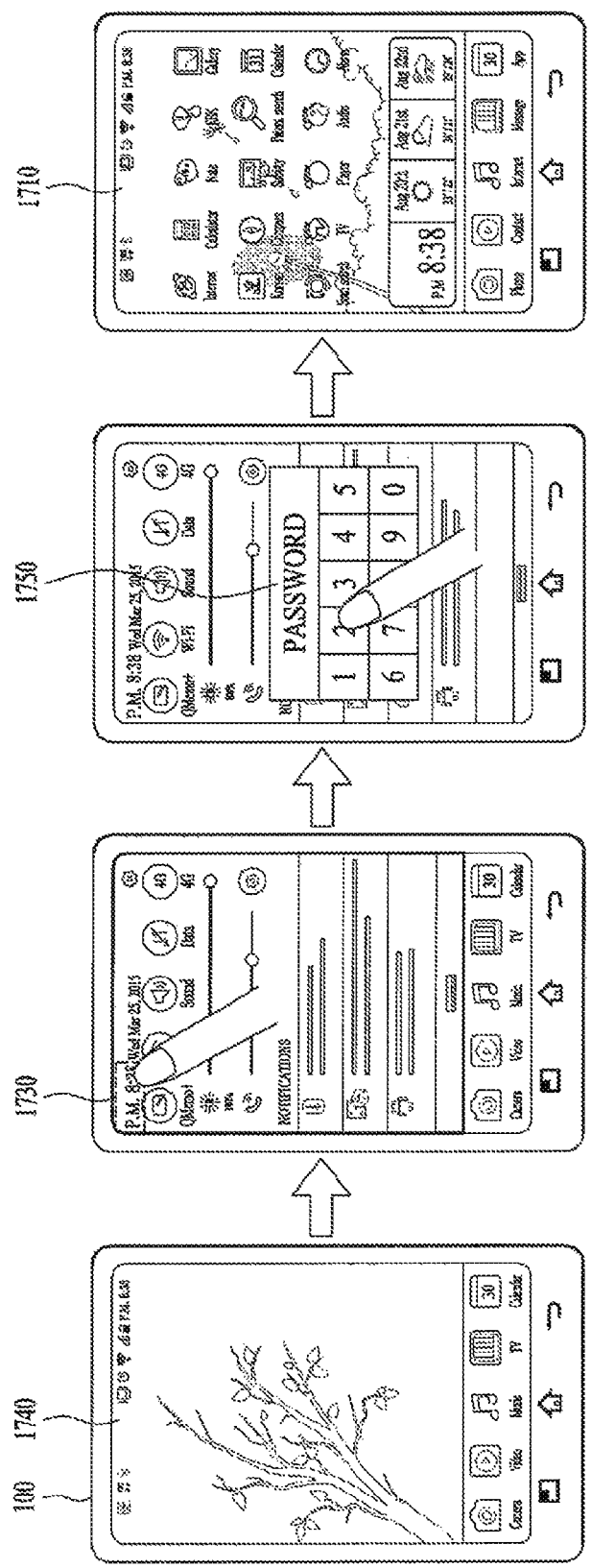

As a different embodiment, as shown in FIG. 17B, if a second input signal is sensed on the predetermined menu option 1730 in the first unlock mode 1740, the mobile terminal 100 can display a user authentication interface 1750. And, if a third input signal is sensed on the user authentication interface 1750, the mobile terminal 100 can enter the second unlock mode 1710.

First of all, referring to a first drawing of FIG. 17B, the mobile terminal can provide a first unlock mode 1740. In this case, an actual owner of the mobile terminal 100 may want to use contents in the second unlock mode 1710. In this case, referring to a second drawing of FIG. 17B, it may be able to sense a second input signal inputted on the predetermined menu option 1730 of the mobile terminal 100. For instance, the second input signal may correspond to a long-touch.

In this case, as shown in a third drawing of FIG. 17B, the mobile terminal 100 can display a user authentication interface 1750. In this case, the user authentication interface 1750 corresponds to an interface for determining whether a user currently using the mobile terminal 100 is a registered user. In an example shown in FIG. 17B, the user authentication interface 1750 may correspond to an interface in which a password constructed by numbers is inputted. Yet, although it is not depicted in FIG. 17B, the user authentication interface 1750 can be provided by various methods including fingerprint recognition, handwriting recognition, voice recognition, face recognition, iris recognition and the like.

Subsequently, as shown in a third drawing of FIG. 17B, the mobile terminal 100 can sense a third input signal inputted on the user authentication interface 1750. In this case, the third input signal may correspond to a predetermined password. In this case, as shown in a fourth drawing of FIG. 17B, the mobile terminal 100 can enter a second unlock mode 1710. Unlike FIG. 17A, referring to the embodiment of FIG. 17B, in order to enter the second unlock mode providing whole contents from the first mode providing a part of the whole contents only, it may be necessary for a user to perform additional authentication via the user authentication interface. By doing so, the mobile terminal 100 can safely provide the second unlock mode to an authenticated user only.

The embodiment of FIG. 17 can be used not only for protecting privacy of a user but also for a state that the user wants to take a rest in daily life, a case of arriving at home after work, or the like. Meanwhile, although it is not depicted in FIG. 17B, if the third input signal inputted on the user authentication interface 1750 is not matched with a predetermined password, the mobile terminal 100 can maintain the first unlock mode 1740.

Meanwhile, in the embodiment of FIG. 17, the predetermined menu option displayed in the first unlock mode and the predetermined menu option displayed in the second unlock mode may be different from each other. This is because if the predetermined menu option displayed in the first unlock mode and the predetermined menu option displayed in the second unlock mode are differently displayed, a user can easily recognize a currently displayed mode among the first unlock mode and the second unlock mode.

FIG. 18 is a diagram for explaining an example of a method of entering a lock mode from an unlock mode of a mobile terminal according to one embodiment of the present disclosure.

An embodiment of FIG. 18 shows a method of entering a first lock mode or a second lock mode by sensing a fourth input signal inputted by a user while a mobile terminal 100 provides a first unlock mode or a second unlock mode.

In this case, a lock mode corresponds to a state that the mobile terminal 100 is not used. In particular, the lock mode can indicate a state that the display unit is inactivated. In case of the aforementioned screen lock state of the display unit, the display unit is in an activated state. On the contrary, the lock mode can indicate a state that the display unit is inactivated. In the embodiment of FIG. 18, the mobile terminal 100 can provide a plurality of lock modes.

For instance, a first lock mode may correspond to a lock mode corresponding to a first unlock mode. Hence, if an event including information on personal privacy occurs in the first lock mode, the mobile terminal 100 may not provide a notification on the event to the display unit. And, for instance, a second lock mode may correspond to a lock mode corresponding to a second unlock mode. Hence, if an event including information on personal privacy occurs in the second lock mode, the mobile terminal 100 can provide a notification on the event to the display unit.

Figure 18A:
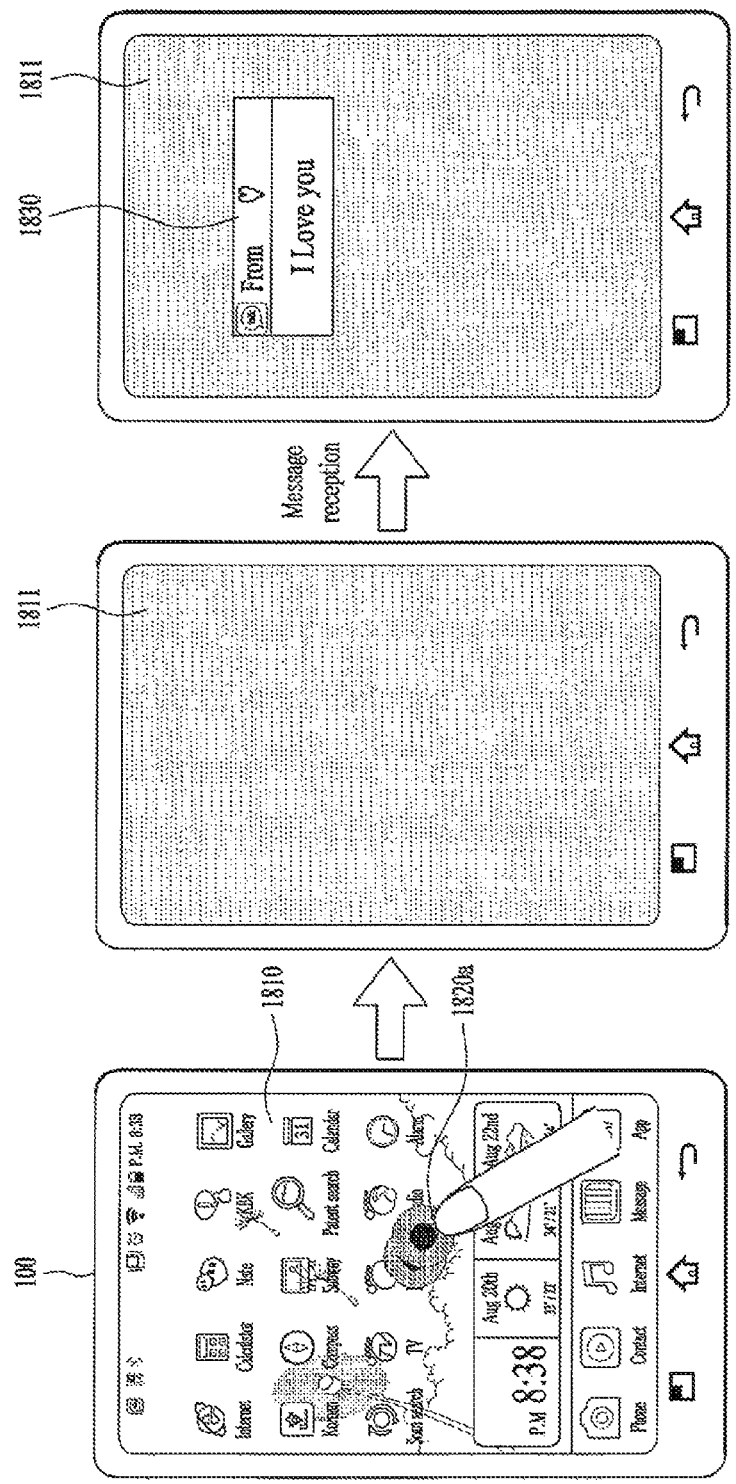

As an embodiment, referring to FIG. 18A, if a fourth input signal 1820a is sensed in a second unlock mode 1810, the mobile terminal 100 can enter a second lock mode 1811. First of all, as shown in a first drawing of FIG. 18A, the mobile terminal 100 can sense the fourth input signal 1820a in the second unlock mode 1810. In this case, the fourth input signal 1820a may correspond to a short-touch input inputted twice. Although it is not depicted in FIG. 18A, the fourth input signal 1820 can include various touch inputs except the short-touch input inputted twice. And, the fourth input signal 1820a may correspond to a signal sensed irrespective of an area of the display unit.

Subsequently, as shown in a second drawing of FIG. 18A, the mobile terminal 100 can inactivate the display unit in a manner of entering the second lock mode 1811. As mentioned in the foregoing description, as a successor of the second unlock mode, the second lock mode corresponds to a mode providing a notification when an event in which information on personal privacy is included occurs. Subsequently, the mobile terminal 100 can receive occurrence of an event providing a notification 1830. In this case, the occurred event corresponds to message reception. As shown in a third drawing of FIG. 18A, the event corresponds to 'I love you' corresponding to a message transmitted from a loved one. Since this message corresponds to a message related to personal privacy, the mobile terminal 100 can provide the notification 1830 in the second lock mode 1811.

As a different embodiment, referring to FIG. 18B, if a fourth input signal 1820b is sensed on a predetermined area 1850 of the display unit in the first unlock mode 1840, the mobile terminal 100 can enter the first lock mode 1841. First of all, as shown in a first drawing of FIG. 18B, the mobile terminal 100 can sense the fourth input signal 1820b inputted on the predetermined area 1850 of the display unit in the first unlock mode 1840. In this case, the fourth input signal 1820b may correspond to a short-touch input inputted twice.

Subsequently, as shown in a second drawing of FIG. 18B, the mobile terminal can enter a first lock mode 1841. Subsequently, the mobile terminal 100 can receive occurrence of an event providing a notification. In this case, the occurred event corresponds to reception of a message. The message may correspond to a message related to a personal privacy identical to the message mentioned earlier in FIG. 18A. In this case, as shown in a third drawing of FIG. 18B, a notification may not be provided in the first lock mode 1841.

Figure 18C:
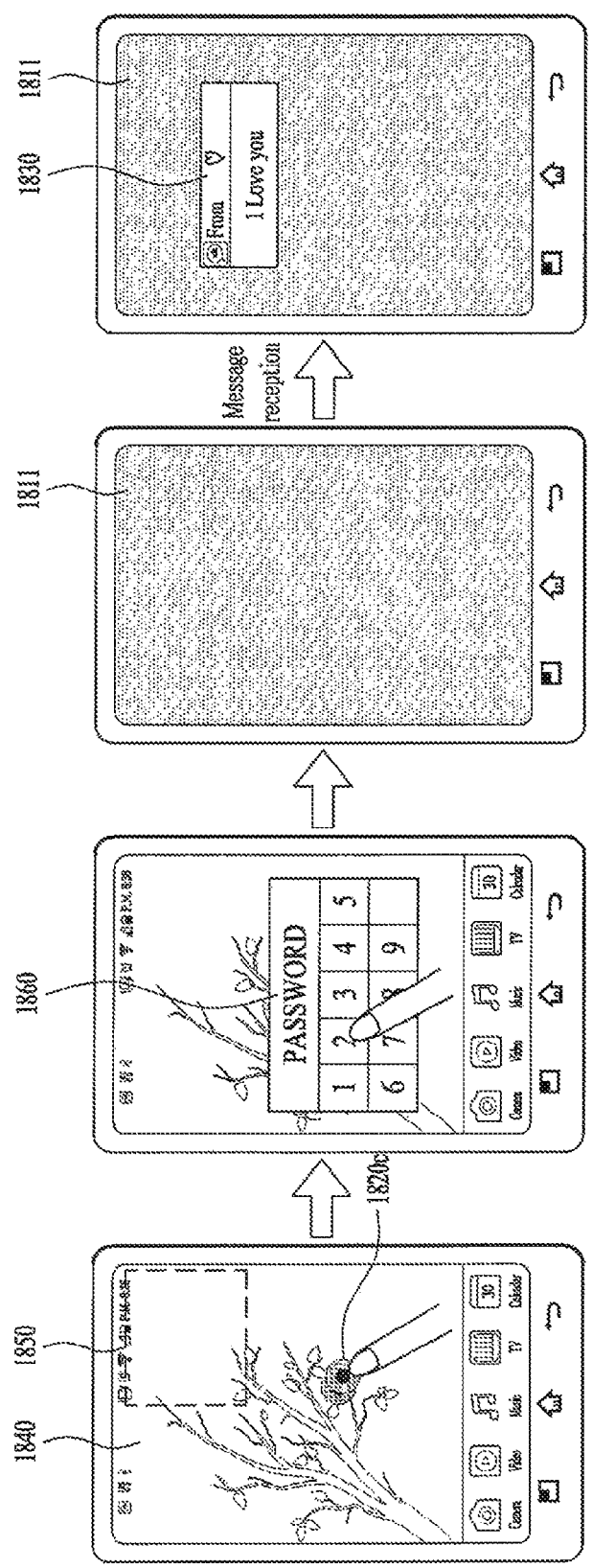

As a different embodiment, referring to FIG. 18C, if a fourth input signal 1820c is sensed on an area except a predetermined area 1850 of the display unit in a first unlock mode 1840, the mobile terminal 100 can display a user authentication interface 1860. And, the mobile terminal 100 can sense a fifth input signal inputted on the user authentication interface 1860. In this case, if the fifth input signal corresponds to a predetermined password, the mobile terminal 100 can enter a second lock mode 1811. And, if the fifth input signal does not correspond to the predetermined password, the mobile terminal can maintain the first unlock mode 1840.

First of all, as shown in a first drawing of FIG. 18C, the mobile terminal 100 can sense a fourth input signal 1820c inputted on an area except a predetermined area 1850 of the display unit in the first unlock mode 1840. Subsequently, as shown in a second drawing of FIG. 18C, the mobile terminal 100 can display a user authentication interface 1860. In this case, the user authentication interface 1860 corresponds to an interface used for determining whether a user currently using the mobile terminal 100 is a registered user. In the example of FIG. 18C, the user authentication interface 1850 may correspond to an interface in which a password constructed by numbers is inputted. Yet, although it is not depicted in FIG. 18C, the user authentication interface 1860 can be provided by various methods including fingerprint recognition, handwriting recognition, voice recognition, face recognition, iris recognition and the like.

Subsequently, the mobile terminal 100 can sense a fifth input signal inputted on the user authentication interface 1860. For instance, the fifth input signal may correspond to a number password inputted on the user authentication interface. As shown in FIG. 18C, if a user is authenticated by the fifth input signal, the mobile terminal 100 can switch to a second lock mode 1811. This is because, since user authentication is completed via the user authentication interface 1860, it is possible to use whole contents. In this case, the mobile terminal 100 can receive occurrence of an event providing a notification 1830.

In this case, the occurred event corresponds to reception of a message. As shown in a fourth drawing of FIG. 18C, the message may correspond to a message 'I love you' transmitted from a loved one. This message corresponds to a message related to a personal privacy. Hence, the mobile terminal 100 can provide a notification 1830 in the second lock mode 1811. Yet, although it is not depicted in FIG. 18C, if the user is not authenticated by the fifth input signal, the mobile terminal 100 can maintain the first unlock mode 1840.

Figure 19:
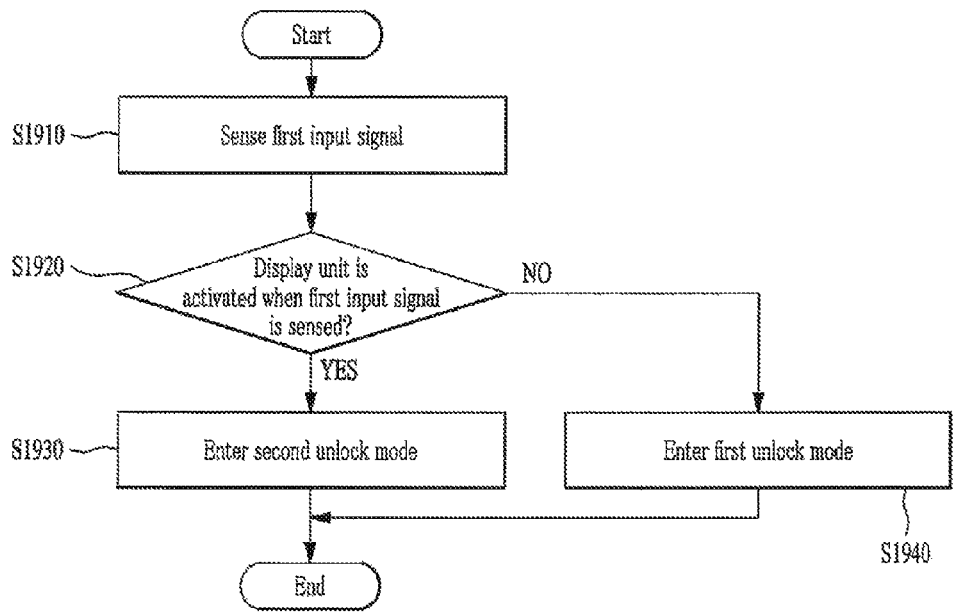
FIG. 19 is a flowchart for a method of controlling a mobile terminal according to one embodiment of the present disclosure.

FIG. 19 is a flowchart for a method of controlling a mobile terminal according to one embodiment of the present disclosure. Each of steps described in the following with reference to FIG. 19 can be controlled by the controller of the mobile terminal shown in FIG. 5.

First of all, the mobile terminal can sense a first input signal [S1910]. The first input signal can include both a touch input and a hovering input. For instance, the first input signal can include a short-touch, a long-touch, a multi touch, a drag touch and the like.

When the first input signal is sensed, the mobile terminal can determine whether the display unit is activated [S1920]. Whether the display unit is activated indicates whether power is supplied to the display unit.

If it is determined as the display unit is activated in the step S1920, the mobile terminal can enter a second unlock mode [S1930]. As mentioned earlier in FIG. 11, the second unlock mode may correspond to a mode providing whole contents among contents capable of being used in the mobile terminal.

Meanwhile, in the step S1920, if it is determined as the display unit is inactivated, the mobile terminal can enter a first unlock mode [S1940]. As mentioned earlier in FIG. 11, the first unlock mode may correspond to a mode providing partial contents among contents capable of being used in the mobile terminal. The first and the second unlock mode can apply various embodiments mentioned earlier in FIGS. 6 to 9.

Figure 20:
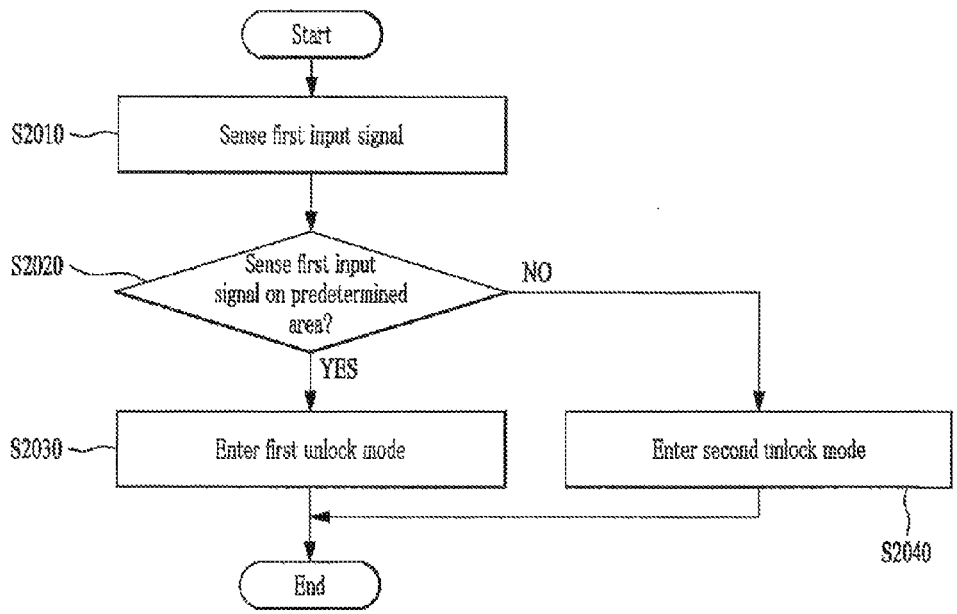
FIG. 20 is a flowchart for a method of controlling a mobile terminal according to one embodiment of the present disclosure.

FIG. 20 is a flowchart for a method of controlling a mobile terminal according to one embodiment of the present disclosure. Each of steps described in the following with reference to FIG. 20 can be controlled by a processor of the mobile terminal shown in FIG. 5. And, in embodiment of FIG. 20, explanation on a part identical or corresponding to the aforementioned embodiment of FIG. 19 is omitted at this time.

First of all, the mobile terminal can sense a first input signal [S2010]. Subsequently, the mobile terminal can determine whether the first input signal is sensed on a predetermined area [S2020]. As mentioned earlier in FIGS. 12 to 15, the predetermined area corresponds to a certain area of the display unit and may correspond to an area not indicated by a separate indicator. An owner of the mobile terminal or an authenticated user memorizes a position of the predetermined area and may be able to input such a signal as a touch input to the predetermined area.

In the step S2020, if the first input signal is sensed on the predetermined area, the mobile terminal can enter the first unlock mode [S2030]. In particular, the owner of the mobile terminal or the authenticated user adds an input signal to the predetermined area incapable of being known to different users and may be then able to provide a part of whole contents only to the different users. And, if the first input signal is sensed on the predetermined area, it indicates a case that a final position of the first input signal is included in the predetermined area.

As an example, as mentioned earlier in FIGS. 12 to 14, the mobile terminal can sense the first input signal inputted on the predetermined area in a state that the display unit is activated. As a different example, as mentioned earlier in FIG. 15, the mobile terminal can sense the first input signal inputted on the predetermined area in a state that the display unit is inactivated.

Meanwhile, in the step S2020, if the first input signal is sensed on an area except the predetermined area, the mobile terminal can enter a second unlock mode [S2040]. In particular, if the first input signal identical to the signal sensed in the step S2030 is sensed on an unlock interface, the mobile terminal can enter the second unlock mode displaying whole contents capable of being used in the mobile terminal. And, if the first input signal is sensed on the area except the predetermined area, it indicates a case that a final position of the first input signal is included in the area except the predetermined area.

As an example, as mentioned earlier in FIGS. 12 to 14, the mobile terminal can sense a first input signal inputted on an area except a predetermined area in a state that the display unit is activated. For instance, the mobile terminal can display an unlock interface in the state that the display unit is activated. In this case, as mentioned earlier in FIG. 12, the area except the predetermined area may correspond to an area on which the unlock interface is displayed. As a different example, as mentioned earlier in FIG. 15, the mobile terminal can sense the first input signal inputted on the area except the predetermined area in a state that the display unit is inactivated.

Figure 21:
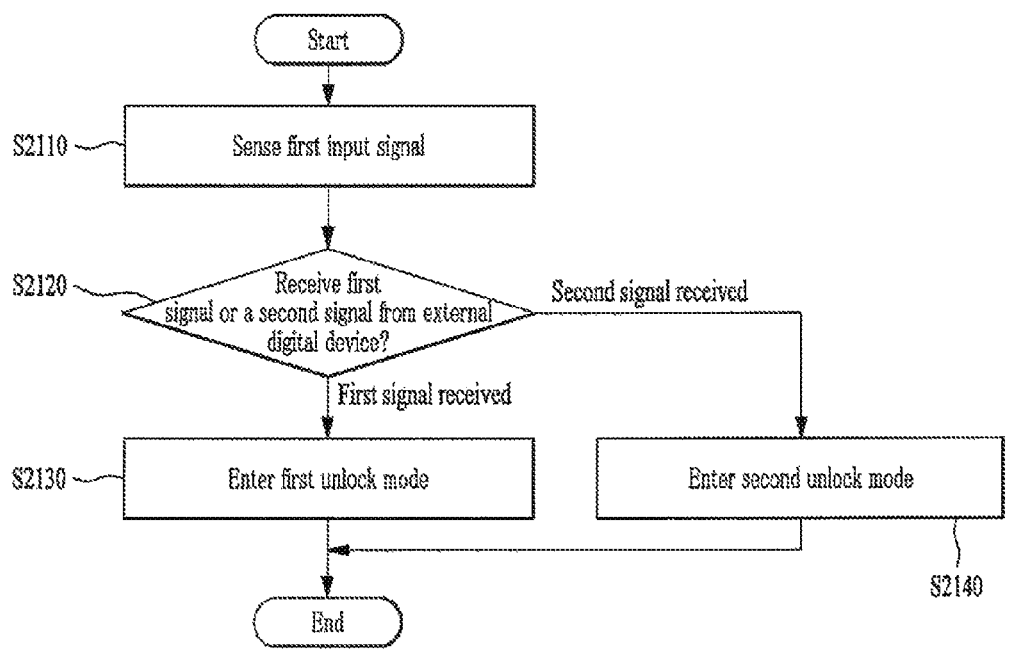
FIG. 21 is a flowchart for a method of controlling a mobile terminal according to one embodiment of the present disclosure.

FIG. 21 is a flowchart for a method of controlling a mobile terminal according to one embodiment of the present disclosure. Each of steps described in the following with reference to FIG. 21 can be controlled by a processor of the mobile terminal shown in FIG. 5. And, in embodiment of FIG. 21, explanation on a part identical or corresponding to the aforementioned embodiment of FIG. 19 is omitted at this time.

First of all, the mobile terminal can sense a first input signal [S2110]. Subsequently, the mobile terminal can determine whether a first signal or a second signal is received from an external digital device [S2120]. In this case, as mentioned earlier in FIG. 16, the external digital device can include a terminal capable of performing communication access with the mobile terminal such as a watch-type terminal, a glass-type terminal, a drone and the like.

In the step S2120, if the first signal is received from the external digital device, the mobile terminal can enter a first unlock mode [S2130]. As mentioned earlier in FIG. 16, the first signal may correspond to a signal indicating a first use mode of the external digital device. And, the first use mode corresponds to a mode of which security is set to the external digital device. The first use mode may correspond to a mode providing partial content only among whole contents.

Meanwhile, in the step S2120, if the second signal is received from the external digital device, the mobile terminal can enter a second unlock mode [S2140]. As mentioned earlier in FIG. 16, the second signal may correspond to a signal indicating a second use mode of the external digital device. And, the second use mode corresponds to a mode of which security is released from the external digital device. The second use mode may correspond to a mode providing whole contents.

Meanwhile, the first and the second use mode can be determined based on various conditions including a current position of the external digital device, whether a user is currently taking a break or at business and the like as well as whether security is set to the external digital device.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display device;
a sensing device configured to sense input signals at the display device; and
a controller configured to control an unlock mode of the mobile terminal based on the input signals, wherein
when a first input signal is sensed in a state in which the display device is deactivated, the mobile terminal is controlled to enter a first unlock mode, and
when the first input signal is sensed in a state in which the display device is activated, the mobile terminal is controlled to enter a second unlock mode,
wherein contents accessible in the first unlock mode is different from contents accessible in the second unlock mode.

2. The mobile terminal of claim 1, wherein an unlock interface is displayed on the display device in the state in which the display device is activated, and when input of the first input signal is sensed on the unlock interface, the mobile terminal is controlled to enter the second unlock mode.

3. The mobile terminal of claim 1, wherein the contents accessible in the first unlock mode corresponds to a portion of the contents accessible in the second unlock mode.

4. The mobile terminal of claim 1, wherein the first unlock mode corresponds to a security configuration mode in which security for content access is set and the second unlock mode corresponds to a security release mode in which security for content access is not set.

5. The mobile terminal of claim 1, wherein the first input signal is a signal for releasing a lock mode of the display device.

6. The mobile terminal of claim 1, wherein
when a second input signal inputted on a predetermined menu object is sensed while in the first unlock mode, a user authentication interface is displayed on the display device to authenticate a registered user, and
when the second input signal inputted on the predetermined menu object is sensed while in the second unlock mode, the mobile terminal is controlled to enter the first unlock mode.

7. The mobile terminal of claim 6, wherein, when a third input signal inputted on the user authentication interface is sensed, the mobile terminal is controlled to enter the second unlock mode, and
wherein the third input signal corresponds to a predetermined password.

8. The mobile terminal of claim 6, wherein the predetermined menu object displayed in the first unlock mode and the predetermined menu object displayed in the second unlock mode are differently displayed.

9. A mobile terminal, comprising:
a display device;
a sensing device configured to sense input signals at the display device; and
a controller configured to control an unlock mode of the mobile terminal based on the input signals, wherein when a first input signal is sensed on a predetermined area of the display device, the mobile terminal is controlled to enter a first unlock mode, and when the first input signal is sensed on an area outside the predetermined area of the display device, the mobile terminal is controlled to enter a second unlock mode, wherein contents accessible in the first unlock mode is different from contents accessible in the second unlock mode.

10. The mobile terminal of claim 9, wherein the first input signal is sensed in a state in which the display device is activated.

11. The mobile terminal of claim 10, wherein a lock screen that includes an unlock interface is displayed on the display device in the state in which the display device is activated, when the first input signal is sensed on a predetermined area of the lock screen, the mobile terminal is controlled to enter the first unlock mode, and when the first input signal is sensed on the unlock interface, the mobile terminal is controlled to enter the second unlock mode.

12. The mobile terminal of claim 11, wherein the predetermined area is different from an area on which the unlock interface is displayed.

13. The mobile terminal of claim 9, wherein the first input signal is sensed in a state in which the display device is deactivated.

14. The mobile terminal of claim 9, wherein when a second input signal inputted on the predetermined area of the display device is sensed while in the first unlock mode, the mobile terminal is controlled to enter a first lock mode, and when the second input signal inputted on an area outside the predetermined area of the display device is sensed while in the first unlock mode, a user authentication interface is displayed to authenticate a registered user.

15. The mobile terminal of claim 14, wherein, when a third input signal inputted on the user authentication interface is sensed, the mobile terminal is controlled to enter a second lock mode, and wherein the third input signal corresponds to a predetermined password.

16. The mobile terminal of claim 14, wherein, when the second input signal is sensed while in the second unlock mode, the mobile terminal is controlled to enter a second lock mode.

17. The mobile terminal of claim 15, wherein the first lock mode is a lock mode that corresponds to the first unlock mode, and the second lock mode is a lock mode that corresponds to the second unlock mode.

18. The mobile terminal of claim 9, wherein when a final position of the first input signal on the display device is contained within the predetermined area of the display device, the mobile terminal is controlled to enter the first unlock mode, and when the final position of the first input signal on the display device is outside the predetermined area of the display device, the mobile terminal is controlled to enter the second unlock mode.

19. A mobile terminal comprising:

a display device;

a sensing device configured to sense input signals at the display device;

a communication device configured to receive signals from an external digital device; and a controller configured to control an unlock mode of the mobile terminal based on a first signal or a second signal received from the external digital device, wherein the first signal received from the external device indicates a first use mode of the external digital device and the second signal received from the external device indicates a second use mode of the external digital device, when the first signal is received from the external digital device and a first input signal is sensed on the display device, the mobile terminal is controlled to enter a first unlock mode, and when the second signal is received from the external digital device and the first input signal is sensed on the display device, the mobile terminal is controlled to enter a second unlock mode, wherein contents accessible in the first unlock mode is different from contents accessible in the second unlock mode.

20. The mobile terminal of claim 19, wherein the first use mode of the external digital device corresponds to a security configuration mode in which security for content access is set and the second use mode of the external digital device corresponds to a security release mode in which security for content access is not set.

* * * * *